US012338803B2

(12) United States Patent
Lewis, III

(10) Patent No.: US 12,338,803 B2
(45) Date of Patent: Jun. 24, 2025

(54) APPARATUS FOR A MODULAR PLASMA REACTOR AND METHOD OF USE

(71) Applicant: Nox Box Technologies LLC, Ormond Beach, FL (US)

(72) Inventor: Joseph E. Lewis, III, Ormond Beach, FL (US)

( * ) Notice: Subject to any disclaimer, the term of this patent is extended or adjusted under 35 U.S.C. 154(b) by 0 days.

(21) Appl. No.: 18/222,176

(22) Filed: Jul. 14, 2023

(65) Prior Publication Data

US 2025/0020112 A1 Jan. 16, 2025

(51) Int. Cl.
*F03H 1/00* (2006.01)

(52) U.S. Cl.
CPC ......... *F03H 1/0012* (2013.01); *F03H 1/0087* (2013.01)

(58) Field of Classification Search
None
See application file for complete search history.

(56) References Cited

U.S. PATENT DOCUMENTS 10,582,667 B2 * 3/2020 Wolfe .................... B65G 27/12
11,168,007 B2 11/2021 Lewis
11,638,769 B1 * 5/2023 Gorobets .................. A61L 2/24 422/29
2020/0071199 A1 * 3/2020 Lewis, III ................ H05H 1/48
2022/0240770 A1 8/2022 Sagiv

FOREIGN PATENT DOCUMENTS

WO 2022/224040 A2 10/2022

OTHER PUBLICATIONS

C3Controls "Microcontrollers Versus PLC's: A Detailed Comparison" (Year: 2020).*
Bhawana Adhikari, Manish Adhikari and Gyungsoon Park, "The Eects of Plasma on Plant Growth, Development, and Sustainability," Appl. Sci. 2020, 10, 6045; doi: 10.3390/app10176045. (Year: 2020).*

* cited by examiner

*Primary Examiner* — David P. Olynick
(74) *Attorney, Agent, or Firm* — Lori Sandman, Esq.

(57) ABSTRACT

Apparatus for a modular plasma reactor and method of use is disclosed. The apparatus includes a modular plasma reactor, wherein the modular plasma reactor includes a housing, a modular ignition unit removably connected to the modular plasma reactor, a modular injector removably connected to the modular plasma reactor, at least a modular reservoir removably connected to the modular injector and a controller communicatively connected to one or more of the modular ignition unit and the modular injector.

20 Claims, 9 Drawing Sheets

APPARATUS FOR A MODULAR PLASMA REACTOR AND METHOD OF USE

FIELD OF THE INVENTION

The present invention generally relates to the field of Non-thermal Plasma (NTP) technology. In particular, the present invention is directed to apparatus for a modular plasma reactor and method of use.

BACKGROUND

Plants regularly undergo a multitude of stresses such as, without limitation, scarcity of water, waterlogging, toxicity, high salinity, extreme temperatures, and the like. These stresses result in less yield of crops. To enhance seed germination and growth under the changing environment, techniques such as chemical, physical, and biological treatment are developing. Existing plasma reactors lacks flexibility and are less cost-effective.

SUMMARY OF THE DISCLOSURE

In an aspect, an apparatus for a modular plasma reactor is disclosed. The apparatus includes a modular plasma reactor, wherein the modular plasma reactor includes a housing, a modular ignition unit removably connected to the modular plasma reactor, a modular injector removably connected to the modular plasma reactor, at least a modular reservoir removably connected to the modular injector and a controller communicatively connected to one or more of the modular ignition unit and the modular injector.

In another aspect, a method of use for a modular plasma reactor is disclosed. The method includes removably connecting a modular ignition unit to a modular plasma reactor, wherein the modular plasma reactor comprises a housing, removably connecting a modular injector to the modular plasma reactor, removably connecting at least a modular reservoir to the modular injector, communicatively connecting a controller to one or more of the modular ignition unit and the modular injector.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatus for a modular plasma reactor and method of use. The apparatus includes a modular plasma reactor, wherein the modular plasma reactor includes a housing, a modular ignition unit removably connected to the modular plasma reactor, a modular injector removably connected to the modular plasma reactor, at least a modular reservoir removably connected to the modular injector and a controller communicatively connected to one or more of the modular ignition unit and the modular injector.

Aspects of the present disclosure can be used to generate reactive oxygen and nitrogen species (RONS) and change solution properties pH, electrical conductivity, and oxidation-reduction potential. Aspects of the present disclosure can also be used to affect the rate of the growth medium (e.g., seed) germination, enhancement in plant growth, as well as an increase in agricultural yields. This is so, at least in part, because the apparatus is configured to expose growth medium to a non-thermal plasma (NTP) using a high energy ignition system. The apparatus may generate a high voltage NTP using air, water, and an electrical load without any harmful emission.

Aspects of the present disclosure may allow for growth medium treatment under low-temperature without damaging growth medium. In some embodiments, aspects of the present disclosure may also allow for a controller to detect a connection between a housing that includes a plasma reactor and the one or more of an ignition unit, an injector and a pressure regulator and control the power provided to the one or more of the ignition unit, the injector and the pressure regulator. Exemplary embodiments illustrating aspects of the present disclosure are described below in the context of several specific examples.

Figure 1:
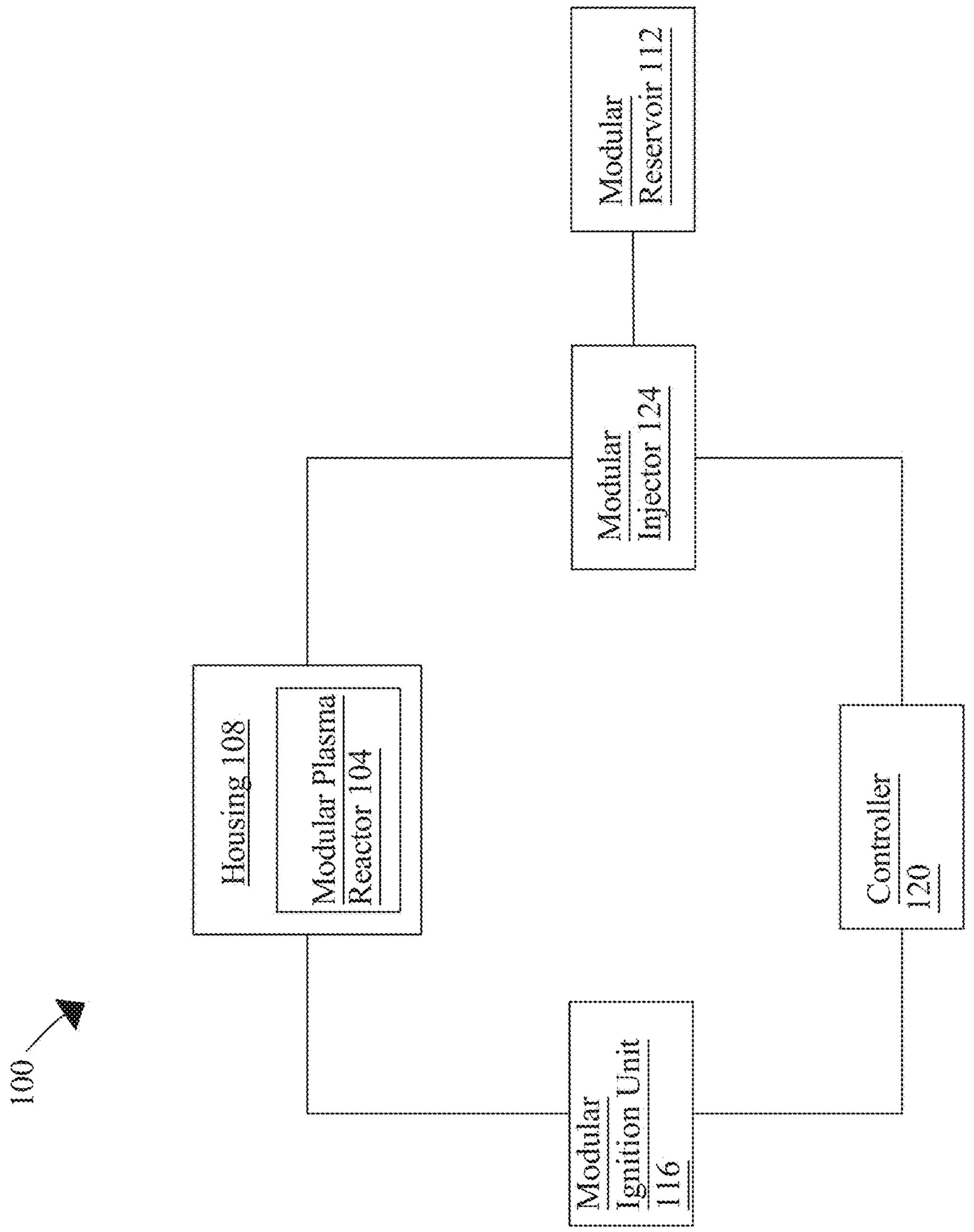
FIG. 1 is a block diagram of an exemplary embodiment of an apparatus for a modular plasma reactor.

Now referring to FIG. 1, a block diagram of an exemplary embodiment of an apparatus 100 for a modular plasma reactor 104 is shown. The apparatus 100 includes a modular plasma reactor 104. For the purposes of this disclosure, a "modular plasma reactor" is a plasma reactor that can be removably connected to other modules. As used in this disclosure, a "plasma reactor" is a device configured to generate, sustain, and/or control plasma. "Plasma," for the purpose of this disclosure, refers to the fourth state of matter, in addition to solid, liquid, and gas. Plasma may include a partially ionized gas consisting of a mixture of ions, electrons, and/or neutral particles (i.e., atoms and molecules). In an embodiment, plasma may be formed when at least a fluid subject to high-energy source, such as, without limitation, heat, radiation, electric filed, and the like, causing the atoms or molecules in at least a fluid to become ionized by losing or gaining electrons. At least a fluid may be inputted into modular plasma reactor 104 using injector as described below in this disclosure. In some cases, plasma may include non-thermal plasma (NTP), wherein the non-thermal plasma is a type of plasma in which the electron temperature is significantly higher than the temperature of the heavier ions and neutral particles. In this case, while the electrons in plasma have high kinetic energy, the overall temperature of at least a fluid may remain relatively low (e.g., often near room temperature of 20-22 C/68-72 F). Additionally, or alternatively, the energy distribution among particles within non-thermal plasma may not be in thermal equilibrium due to the electrons, being much lighter than ions and neutral particles, may gain energy more rapidly when subjected to an electric or magnetic field, leading to a higher electron temperature. On the other hand, heavier ions and neutral particles may move more slowly and remain cooler, resulting in low temperature of at least a fluid. Additional disclosure related to the modular plasma reactor 104 may be found in U.S. patent application Ser. No. 18/222,080, filed on Jul. 14, 2023, entitled as "APPARATUS FOR IMPROVED INJECTION FOR A PLASMA REACTOR," the entirety of which is incorporated as a reference.

With continued reference to FIG. 1, a modular plasma reactor 104 includes a housing 108. As used in this disclosure, a "housing" refers to an outer structure configured to contain a plurality of components, such as, without limitation, components of apparatus 100 as described in this disclosure. In some cases, the housing 108 may include a durable, lightweight material such as without limitation, plastic, metal, and/or the like. In some embodiments, the housing 108 may be scalable in size. In some embodiments, the housing 108 may be designed and configured to protect sensitive components of apparatus 100 from damage or contamination. In some embodiments, the housing 108 may be portable. For the purposes of this disclosure, a "portable" refers to an object being designed to be transported from place to place. In a non-limiting example, the portable housing 108 may include an outer casing of components of the apparatus 100. For example and without limitation, the housing 108 may be configured to protect components of a modular plasma reactor 104, at least a modular reservoir 112, a modular ignition unit 116, a modular pressure regulator, a controller 120, and the like separately or together. In some embodiments, the housing 108 may include one or more flat surface on the housing 108. For the purposes of this disclosure, "flat surface" refers to a surface of an object that is smooth and even, without any significant curvature or bumps. In a non-limiting example, the housing 108 may include the flat surface so that the housing 108 can be placed on the ground securely. In another non-limiting example, the housing 108 may include the flat surface so that the housing 108 can be mounted on another flat surface. In another non-limiting example, the housing 108 may include the flat surface so that another object with the flat surface can be mounted on the housing 108. In some embodiments, the housing 108 may include one or more surface coatings and/or modifications that reduce the likelihood of unwanted adhesion or interference with external components such as debris, foreign object, liquid, and the like. Additionally, or alternatively, the housing 108 may further include features such as latches, clips, or other fasteners that help to secure the housing 108 in place during use.

With continued reference to FIG. 1, in some embodiments, a housing 108 may include at least an aperture that provides a path for a connection between modules for communication. In a non-limiting example, the at least an aperture of the housing 108 of the modular injector 124 may provide the path for at least a fluid inlet of the modular injector 124 to be connected with an outlet of the at least a modular reservoir 112. The at least a fluid inlet of the modular injector 124 and the outlet of the at least a modular reservoir 112 are disclosed further in detail below. In another non-limiting example, the at least an aperture of the housing 108 of the modular plasma reactor 104 may provide the path for one or more continuous conductors of the modular ignition unit 116 to be connected with at least an electrode of the modular plasma reactor 104. The at least an electrode disclosed herein is further described below. In another non-limiting example, the at least an aperture of the housing 108 of the modular plasma reactor 104 may provide the path for at least a fluid outlet of the modular injector 124 to be fluidically connected with the modular plasma reactor 104. The at least a fluid outlet of the modular injector 124 is further described below.

With continued reference to FIG. 1, as used in this disclosure, "communication" is an attribute wherein two or more relata interact with one another, for example within a specific domain or in a certain manner. In some cases, communication between two or more relata may be of a specific domain, such as without limitation electric communication, fluidic communication, informatic communication, mechanical communication, and the like. As used in this disclosure, "informatic communication" is an attribute wherein two or more relata interact with one another by way of an information flow or information in general. For example, and without limitation, a communication between a modular injector 124 and a controller 120 may include the informatic communication. For example, and without limitation, a communication between a modular ignition unit 116 and the controller 120 may include the informatic communication. As used in this disclosure, "mechanic communication" is an attribute wherein two or more relata interact with one another by way of mechanical means, for instance mechanical effort (e.g., force) and flow (e.g., velocity). "Electric communication," as used in this disclosure, is an attribute wherein two or more relata interact with one another by way of an electric current or electricity in general. For example, and without limitation, a communication between the modular injector 124 and the modular ignition unit 116 may include the electric communication through one or more continuous conductors. "Fluidic communication," as used in this disclosure, is an attribute wherein two or more relata interact with one another by way of a fluidic flow or fluid in general. For example, and without limitation, a communication between the modular injector 124 and at least a modular reservoir 112 may include the fluidic communication, where at least a fluid flows between the modular injector 124 and the at least a modular reservoir 112. The at least a fluid is disclosed further in detail below. As used in this disclosure, a "fluid" is a gaseous or liquid material that can flow, including without limitation water, nitrogen, oxygen, and/or other gases and/or liquids.

With continued reference to FIG. 1, a housing 108 may further include a treatment chamber configured to contain a growth medium. As used in this disclosure, a "treatment chamber" is a controlled space designed to hold a specific material, substance, object and subject it to a particular treatment. In an embodiment, treatment chamber may be constructed as an open system; for instance, and without limitation, treatment chamber may include an open-top container. In another embodiments, treatment chamber may be constructed as a closed system; for instance, and without limitation, treatment chamber may be an enclosed container with an airtight seal. In some embodiments, treatment chamber may be designed to provide easy access to the growth medium being treated. In a non-limiting example, treatment chamber may include removable or hinged doors or ports for loading and/or unloading growth medium. In another non-limiting example, treatment chamber may include one or more window with/without cover for visual inspection or sampling during the treatment process.

With continued reference to FIG. 1, as used in this disclosure, a "growth medium" is a substance or material that provides essential nutrients and environmental conditions for the growth and proliferation of microorganisms, cells, tissues. In an embodiment, one or more seeds may be placed in the growth medium. "Seeds," for the purpose of this disclosure, are a mature, fertilized ovule of a flowering plant (i.e., angiosperms) that contains an embryonic plant within a protective outer covering, serve as the primary means of reproduction for many plant species, enabling them to disperse and establish new plants. In some embodiments, seeds may include, without limitation, cereal seeds (e.g., wheat, rice, corn, barley, oats, millets, and the like), legume seeds (e.g., soybeans, peas, beans, lentils, chickpeas, peanuts, and the like), oilseeds (e.g., sunflower, rapeseed, flaxseed, sesame, safflower, and the like), vegetable seeds (e.g., tomatoes, peppers, cucumbers, eggplants, lettuce, spinach, and the like), and fruit seeds (e.g., watermelon, muskmelon, apple, citrus, and the like). In such an embodiment, growth medium may include a nutrient-rich environment that provides the essential conditions for germination and growth of the seeds. In some cases, growth medium may provide environmental factors such as, without limitation, temperature, pH level, oxygen, and the like required for the seed to germinate and develop into a healthy plant. In a non-limiting example, the growth medium may include soil, wherein the soil may include a complex mixture of mineral particles, organic matter, water, air, living organisms, and the like. In another non-limiting example, the growth medium may include soilless mix or a specially formulated medium designed for seed germination and plant growth.

With continued reference to FIG. 1, an apparatus 100 includes a modular ignition unit 116. In some embodiments, the modular ignition unit 116 is removably connected to a modular plasma reactor 104. For the purposes of this disclosure, "removably connected" refers to an ability for an object that is connected to another object to be disconnected from the other object without damaging or breaking said objects. In some embodiments, the modular ignition unit 116 may include a housing 108 as disclosed above. In some embodiments, the removable connection may include threaded connection. For the purposes of this disclosure, "threaded connection" is a type of connection that involves mating male and female halves together to create a connection to hold the threads together. As a non-limiting example, the threaded connection may be done by way of gendered mating components. As a non-limiting example, the gendered mating components may include a male component or plug which is inserted within a female component or socket. In some cases, the threaded connection may be removable. In some cases, the threaded connection may be removable, but requires a specialized tool or key for removal. In some embodiments, the threaded connection may be achieved by way of one or more of plug and socket mates, pogo pin contact, crown spring mates, and the like. In some cases, the threaded connection may be keyed to ensure proper alignment of a mating component. In some cases, the threaded connection may be lockable. As used in this disclosure, a "mating component" is a component that mates with at least another component. As a non-limiting example, the mating component may include a connector. In another embodiment, the removable connection may include bayonet connections. The bayonet connections may use a locking mechanism that allows the two components to be connected by inserting and twisting them into place. In another embodiment, the removable connection may include snap-fit connections. In some embodiments, the snap-fit connections may include a series of tabs or hooks that snap into place when the two components are pushed together. As a non-limiting example, the snap-fit connections may include snap-fit clips, snap-fit tabs, snap-fit hinges, snap-fit latches, snap-fit hooks, snap-fit pins, and the like. In another embodiment, the removable connection may include latch connections. The latch connections uses a latch or locking mechanism that secures the two components together. As a non-limiting example, the latch connections may include cabinet latches, door latches, aircraft fasteners, and the like. In another embodiment, the removable connection may include clamp connections. In some embodiments, the clamp connections uses a clamp or compression mechanism to hold the two components together. As a non-limiting example, the clamp connections may include hose clamps, c-clamps, pipe clamps, wire rope clamps, shaft collars, spring clamps, and the like. In another embodiment, the removable connection may include magnetic connections. In some embodiments, the magnetic connections uses magnets to hold the two components together. In some embodiments, the removable connection may include connectors, screws, adapters, feedthrough, and the like. For the purposes of this disclosure, a "connector" is a component configured to create an electrical or mechanical connection between two or more objects. Examples of connectors include plug and socket connectors, terminal blocks, crimp connectors, and the like. For the purposes of this disclosure, a "feedthrough" is a type of electrical component that allows electrical signals or power to pass through a barrier or enclosure while maintaining isolation between the inside and outside of the enclosure.

With continued reference to FIG. 1, in an embodiment, a modular ignition unit 116 may be removably connected to a modular plasma reactor 104 using one or more continuous conductors. A "continuous conductor," as described herein, is an electrical conductor, without any interruption, made from electrically conducting material that is capable of carrying electrical current over a distance. As a non-limiting example, the electrically conductive material may include any material that is conductive to electrical current and may include, as a nonlimiting example, various metals such as copper, steel, or aluminum, carbon conducting materials, or any other suitable conductive material. In another embodiment, the modular ignition unit 116 may be removably connected to the modular plasma reactor 104 using a connector or an adapter. In some embodiments, the connector may be used to join wires or cables together. As a non-limiting example, the connector may connect the one or more continuous conductors. In another embodiment, the modular ignition unit 116 may be removably connected to the modular plasma reactor 104 using a high-voltage feedthrough. For the purposes of this disclosure, a "high-voltage feedthrough" is a sealed electrical connector that is designed to pass high-voltage current through a vacuum or pressurized chamber such as a housing of a plasma reactor.

With continued reference to FIG. 1, for the purposes of this disclosure, a "modular ignition unit" is an ignition unit that can be removably connected to other modules. As used in this disclosure, an "ignition unit" is an electrical component responsible for supplying an initial electrical voltage necessary to initiate electrical discharge between electrodes. In a non-limiting example, the modular ignition unit 116 may be configured to supply an electrical voltage to at least an electrode. The at least an electrode is disclosed further in detail below. In some embodiments, the modular ignition unit 116 may include a power source. As used in this disclosure, a "power source" is any system, device, or means that provides power such as, without limitation, electric power to a device. Power source may provide electrical power to modular ignition unit 116 and/or other devices/components within apparatus 100 described in this disclosure, such as, without limitation, modular plasma reactor 104, modular injector 124, any computing device and/or the like. In a non-limiting example, a controller 120 may be electrically connected to a power source. As a non-limiting example, the controller 120 may control power to any components of the apparatus 100 as described below. In some embodiments, the power source may be externally electrically connected to the controller 120. In such embodiment, the power source may include an external power source such as, without limitation, a wall outlet. In some cases, transmitting electric power may include using one or more continuous conductor. In some embodiments, the power source may include a battery. In an embodiment, the power source may include direct current (DC) power. In another embodiment, the power source may include alternating current (AC) power. In some embodiments, additionally or alternatively, the power source may include AC or DC renewable power. As a non-limiting example, the AC or DC renewable power may include electrical power that is generated from renewable sources of energy such as solar, wind, hydro, geothermal, and biomass. Additional disclosure related to the modular ignition unit 116 may be found in U.S. patent application Ser. No. 18/222,080, filed on Jul. 14, 2023 and entitled, "APPARATUS FOR IMPROVED INJECTION FOR A PLASMA REACTOR," which is incorporated by reference herein in its entirety.

With continued reference to FIG. 1, in some embodiments, a modular ignition unit 116 may be configured to convert a lower input voltage (e.g., 110V/220V for AC voltages or 12V/24V for DC voltages) from power source into a higher output voltage, thereby providing necessary electrical energy to drive a modular plasma reactor 104. In a non-limiting example, the modular ignition unit 116 may include an ignition transformer. As used in this disclosure, an "ignition transformer" is an electrical transformer designed to generate a high voltage output which is used to initiate electrical discharge, wherein the electrical transformer is a passive electrical device that transfers electrical energy from one circuit to another through the process of electromagnetic induction. In some cases, the electrical transformer may be used to increase or decrease the voltage levels of alternating current (AC) electrical signal while maintaining the same frequency. In a non-limiting example, ignition transformer may be configured to step up the input voltage from a lower level (from power source) to a higher voltage level required by the modular plasma reactor 104 to create an electrical arc (i.e., point of arc). In some embodiments, the ignition transformer may include two sets of windings, wherein the two sets of windings may include a primary winding and a secondary winding. Two sets of windings may be wound around a magnetic core. In some cases, primary winding may be connected to lower voltage input, while secondary winding may generate high voltage output. In a non-limiting example, the modular ignition unit 116 may include ignition transformer configured to converts electrical power received from power source into a high-voltage discharge of 6 kV to 30 k. In another embodiment, the voltage range may be 3 kV to 18 k. With continued reference to FIG. 1, in some embodiments, a modular ignition unit 116 may be capable of converting AC voltage, which oscillates periodically between positive and negative values, into direct current, which has a constant polarity (positive or negative) and does not change over time, for connected electrodes to produce a controlled and/or stable electrical discharge to generate and/or maintain the plasma. In some cases, an apparatus 100 may need to convert AC to DC power supply to perform a pulsed operation. During the pulse plasma operation, a modular plasma reactor 104 may operate in a pulsed mode, where the plasma may be generated and sustained for short periods followed by a period of no electrical discharge. DC power supply may be easily controlled and switched on and off as required, thereby making it suitable for pulsed plasma operation. In some cases, the apparatus 100 may convert AC to DC power supply to reduce electrode wear and contamination; for instance, and without limitation, in AC-powered modular plasma reactor 104, the constantly changing polarity of electrodes may lead to accelerated electrode wear and the release of electrode material into the generated plasma. By using a DC power supply, the electrodes may maintain a constant polarity, reducing wear and contamination and increasing lifetime of the electrodes. In an embodiment, apparatus 100 may also convert AC to AC. For example, AC to AC converters may be used for converting the AC waveforms with one particular frequency and magnitude to AC waveform with another frequency at another magnitude. For example, an AC voltage controller may be a thyristor-based device which converts fixed alternating voltage directly to variable alternating voltage without a change in frequency. AC voltage controller may be a phase-controlled device and hence no force commutation circuitry may be required and natural or line commutation may be used. In a non-limiting example, the modular ignition unit 116 may include a rectifier. As used in this disclosure, a "rectifier" is an electrical device or circuit that converts AC to DC. The rectifier may be built using one or more diodes, wherein the diodes are semiconductor devices that allow electrical current to flow in only one direction and have a low resistance to electrical current flow in the forward direction (when the voltage is positive) and a high resistance to electrical current flow in the reverse direction (when the voltage is negative). In some cases, the rectifier may include, without limitation, half-wave rectifier, full-wave rectifier, and the like.

With continued reference to FIG. 1, in some embodiments, a modular ignition unit 116 may include a power regulator (i.e., filter). As described in this disclosure, a "power regulator" is an electric device in power source that performs electrical power regulation or redistribution, wherein "power regulation" or "power redistribution," as described herein, refers to a process that keeps voltage of power source below its maximum value during operation, non-operation, or charging. In a non-limiting example, the power regulator may be used to remove or attenuate unwanted frequencies, noise, or voltage fluctuations from the output voltage or current. The power regulator may include, without limitation, passive filter, active filter, EMI/RFI filter, voltage regulator, and the like. Additionally, or alternatively, modular ignition unit 116 may include a balancer. As described herein, a "balancer" is an electric that performs power balancing, wherein "power balancing," for the purpose of this disclosure, refers to a process that balances electric energy from one or more first power sources (e.g., strong batteries) to one or more second power sources (e.g., weaker batteries). Persons skilled in the art, upon reviewing the entirety of this disclosure, will be aware of various devices/components that may be used within modular ignition unit 116 of apparatus 100.

With continued reference to FIG. 1, additionally or alternatively, in some embodiment, a plasma reactor 104 may include an on-board ignition unit. For the purposes of this disclosure, an "on-board ignition unit" is an ignition unit that is included in a housing that includes a plasma reactor. In some embodiments, the on-board ignition unit may be directly connected to the modular plasma reactor 104 using a continuous conductor, a feedthrough, a connector or an adapter as described above. In some embodiments, the on-board ignition unit may be directly connected to the modular plasma reactor 104. As a non-limiting example, in a direct connection, the on-board ignition unit may be physically attached to at least an electrode of the modular plasma reactor 104 or other components inside the housing 108. As another non-limiting example, the on-board ignition unit may be directly connected to the modular plasma reactor 104 using a variety of techniques, such as but not limited to welding, soldering, brazing, adhesive bonding, or mechanical fasteners. As a non-limiting example, the mechanical fasteners may include bolts, screws, nuts, washers, rivets, pins, and the like. In some embodiments, a controller 120 may be removably connected to the on-board ignition unit. In some embodiments, the controller 120 may be configured to control a power to the on-board ignition unit to supply an initial electrical voltage necessary to initiate electrical discharge between electrodes.

With continued reference to FIG. 1, additionally or alternatively, a modular ignition unit 116 may include a coil. As used in this disclosure, a "coil" is a wound spiral or helix of conductive wire that creates an electromagnetic field when an electric current flows through it. In a non-limiting example, the coil may be electrically connected to at least an electrode of at least a pair of electrodes of a modular plasma reactor 104, configured to initiate electrical discharge in the modular plasma reactor 104. As a non-limiting example, the coil may include an inductive coil or a high-voltage transformer coil. For the purposes of this disclosure, an "inductive coil" is an electronic component that stores energy in a magnetic field when an electrical current flows through it. As a non-limiting example, the inductive coil may include a wire coil that is wound around a core material, such as iron, ferrite or the like, that amplifies the magnetic field. In some embodiments, the inductive coil or the high-voltage transformer coil may generate high-voltage electrical pulses necessary to create electrical discharge between a first electrode and a second electrode of the at least a pair of electrodes of the modular plasma reactor 104. By passing the high-frequency electrical current through the inductive coil, an oscillating magnetic field can be created. This magnetic field can then induce an electrical current in the gas or plasma, ionizing it and creating a plasma discharge (e.g. inductively coupled plasma (ICP)). In some embodiments, the magnetic field created around the inductive coil can be used to confine the plasma within the modular plasma reactor 104.

Figure 3:
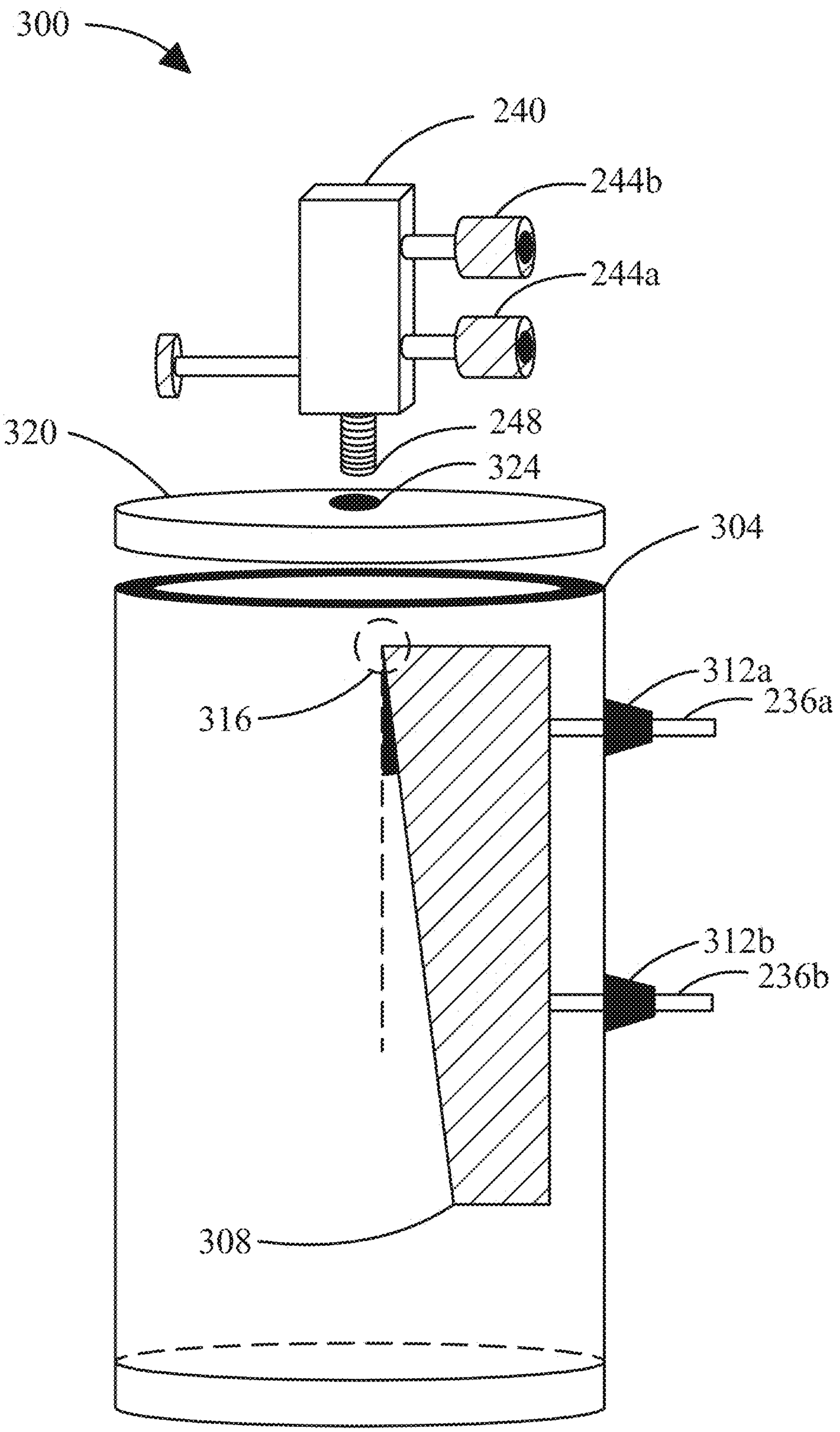
FIG. 3 illustrates an exemplary embodiment of a plasma reactor assembly.

With continued reference to FIG. 1, an apparatus 100 includes a modular injector 124. For the purposes of this disclosure, a "modular injector" is an injector that can be removably connected to other modules. As used in this disclosure, an "injector" is a component designed to introduce at least a fluid into a plasma reactor, specifically, reaction region of plasma reactor. In a non-limiting example, the modular injector 124 may be configured to feed at least a fluid through reaction region. The reaction region and the at least a fluid disclosed herein are described below. The at least a fluid may then be used by the modular plasma reactor 104 to generate plasma. In some embodiments, the modular injector 124 is removably connected to the modular plasma reactor 104. In some embodiments, the modular injector 124 may be connected to modular plasma reactor 104 using an injector mount flange. As used in this disclosure, an "injector mount flange" is a rim that projects from an object, that is used to attach injector to a housing of a plasma reactor. In a non-limiting example, the injector mount flange may include an interface between the modular injector 124 and the modular plasma reactor 104. In some cases, at least a fluid outlet of the modular injector 124 may include a threaded adaptor. Both the at least a fluid outlet and the interface may include a threaded section; for instance, and without limitation, the at least a fluid outlet/interface may include a male/female threaded section, wherein the male and the female threaded section are compatible (i.e., matched). The modular injector 124 may be threaded, using the at least a fluid outlet with threaded adaptor onto the injector mount flange at the interface. An exemplary configuration of the modular injector 124, the at least a fluid outlet of the modular injector 124, the injector mount flange and the interface is shown in FIG. 3.

With continued reference to FIG. 1, a modular injector 124 may include at least a fluid inlet. As used in this disclosure, a "fluid inlet" is an entry point through which at least a fluid is introduced into the modular injector 124 before being fed into reaction region of a modular plasma reactor 104 or any other process described in this disclosure. In a non-limiting example, the at least a fluid inlet may be connected with outlet of at least a modular reservoir 112 as described above. In some cases, the at least a fluid inlet may be designed to provide a secure, leak-free connection with the at least reservoir; for instance, and without limitation, the at least a fluid inlet may be sealed using one or more sealing elements such as O-rings, gaskets, thread sealants, and the like to ensure a tight seal and/or prevent leaks or contamination. The modular injector 124 may include at least a fluid outlet. As used in this disclosure, a "fluid outlet" is an exit point through which at least a fluid is discharged from the modular injector 124 into reaction region of the modular plasma reactor 104. In some cases, the at least a fluid outlet may be configured to allow at least a fluid to be released into the intended location within reaction region. For example, and without limitation, the at least a fluid outlet may be placed at the center and right above at least a pair of electrodes. The at least a fluid outlet may be at a distance with at least a pair of electrodes or reaction region. Such distance may impact the time and space available for at least a fluid to mix and interact with the plasma or other process components. In some cases, the at least a fluid outlet may be configured to provide an optimal flow pattern and dispersion of the at least a fluid into reaction region. In a non-limiting example, the at least a fluid outlet may include a nozzle (i.e., a specially-shaped opening) designed to create a directed, high-velocity stream of at least a fluid, which may improve mixing and dispersion in reaction region. Such nozzle may include, without limitation, swirl nozzle, fan spray nozzle, impinging jet nozzle, multi-hole nozzle, atomizing nozzle, and the like.

With continued reference to FIG. 1, additionally, or alternatively, a modular injector 124 may include one or more valves configured to monitor, control, or otherwise regulate the flow of at least a fluid fed through reaction region of a modular plasma reactor 104. As used in this disclosure, a "valve" is a component that controls fluidic communication between two or more components (e.g., between at least a modular reservoir 112 and the modular injector 124). Exemplary non-limiting valves include directional valves, control valves, selector valves, multi-port valves, check valves, and the like. Valves may include any suitable valve construction including ball valves, butterfly valves, needle valves, globe valves, gate valves, wafer valves, regulator valves, and the like. Valves may be included in a manifold of hydraulic or pneumatic circuit, for example allowing for multiple ports and flow paths. Valves may be actuated by any known method, such as without limitation by way of hydraulic, pneumatic, mechanical, or electrical energy. For instance, in some cases, a valve may be actuated by an energized solenoid or electric motor. Valve actuators and thereby valves themselves, may be controlled by a controller 120 as described in detail below. The controller 120 may be in communication with valve, for example by way of one or more of electrical communication, hydraulic communication, pneumatic communication, mechanical communication, and the like.

With continued reference to FIG. 1, in some embodiments, a modular injector 124 may include a flow adjust component. As used in this disclosure, a "flow adjustment component" is a device that allows for the precise control and regulation of the fluid flow rate through an injector. In some cases, the flow adjustment component may include a manual flow control valve which can be adjusted by hand to regulate the fluid flow rate through the modular injector 124. In a non-limiting example, by turning a knob, valve opening or the opening of at least a fluid outlet may be changed, allowing for more or less fluid to pass through the modular injector 124 or introduce into a modular plasma reactor 104. In some cases, the flow adjustment component may include an actuator which can be controlled by a controller 120 to the fluid flow rate through the modular injector 124. The controller 120 may be in communication with the flow adjustment component, for example by way of one or more of electrical communication, hydraulic communication, pneumatic communication, mechanical communication, and the like. In some embodiments, the flow adjustment component may include an 8× turn-down ratio. As used in this disclosure, a "turn-down ratio" is a measure of the versatility and flexibility of flow adjustment component which indicates how well the flow adjustment component accommodates different flow rate requirements within a system. Such flow adjustment component may control fluid flow rate over a range of eight times the minimum flow rate. For example, if the minimum flow rate of the flow adjustment component is 1 gallon per minute (GPM), an 8× turn-down ratio may indicate that the flow adjustment component may be able to effectively regulate flow rates from 1 GPM up to 8 GPM.

With continued reference to FIG. 1, an apparatus 100 includes at least a modular reservoir 112. For the purposes of this disclosure, a "modular reservoir" is a reservoir that can be removably connected to other modules. As used in this disclosure, a "reservoir" is a container or storage chamber designed to hold at least a fluid. In a non-limiting example, the at least a reservoir may be configured to contain at least a fluid. The at least a reservoir may provide a consistent and controlled supply of the at least a fluid for the treatment of growth medium as described in further detail below. In an embodiment, the at least a fluid may include a substance that enables the production of electrical discharge. In some cases, the at least a fluid may include liquid; for instance, and without limitation, the at least a fluid may include water, organic solvents, electrolyte solutions, and the like. In other cases, the at least a fluid may include one or more gases; for instance, and without limitation, the at least a fluid may include inert gases (e.g., nitrogen, argon, helium, neon, and the like), oxygen, carbon dioxide, air, reactive gases (e.g., hydrogen, ammonia, sulfur hexafluoride, and the like), and the like. Additionally, or alternatively, the apparatus 100 may include a plurality of reservoirs 112. In an embodiment, the at least a modular reservoir 112 may include a first modular reservoir 112 configured to contain a first fluid and a second modular reservoir 112 configured to contain a second fluid, wherein the first fluid may include at least a gas and the second fluid may include at least a liquid.

With continued reference to FIG. 1, at least a modular reservoir 112 may be constructed from materials that are compatible with at least a fluid being stored. For example, and without limitation, the at least a modular reservoir 112 may be made from material such as corrosion-resistant metals, plastics, and/or glass. In some cases, the at least a modular reservoir 112 may be appropriately sized to provide an adequate supply of fluid throughout the treatment process without frequent refilling or interruptions. The at least a modular reservoir 112 may include at least an inlet, at least an outlet, or both. In a non-limiting example, the at least an inlet may be used for filling the at least a modular reservoir 112 with the at least a fluid and the at least an outlet may be connected to a modular injector 124 or other fluid delivery component of apparatus 100 such as a modular pressure regulator as described in further detail below. in some embodiments, at least a modular reservoir 112 is removably connected to the modular injector 124. The at least a fluid may be input through the at least an inlet into the at least a modular reservoir 112 and/or output through the at least an outlet to the modular injector 124. In the case of apparatus 100 having a plurality of reservoirs 112, each modular reservoir 112 of plurality of reservoirs 112 may include the at least an inlet and the at least an outlet. In a non-limiting example, a first modular reservoir 112 configured to contain a first fluid may include a first inlet and a first outlet, a second modular reservoir 112 configured to contain a second fluid may include a second inlet and a second outlet, wherein the first inlet/first outlet may never intersect with the second inlet/second outlet. In such embodiment, the first fluid and the second fluid may not contact each other before output through the first outlet/second outlet.

With continued reference to FIG. 1, in some embodiments, an apparatus 100 may include a modular pressure regulator. For the purposes of this disclosure, a "modular pressure regulator" is a pressure regulator that can be removably connected to other modules. As used in this disclosure, a "pressure regulator" is a component designed to control and maintain the pressure of at least a fluid, wherein such pressure drives the flow of the at least a fluid into a plasma reactor. In an embodiment, the modular pressure regulator may include an atmospheric pressure system. As used in this disclosure, an "atmospheric pressure system" is a mechanism that controls the pressure of the fluid being introduced into a plasma reactor around atmospheric pressure. "Atmospheric pressure," for the purpose of this disclosure, is the pressure exerted by the weight of air in the Earth's atmosphere at sea level, which is approximately 101.3 kilopascals (kPa) or 14.7 pounds per square inch (psi). In some embodiments, the modular pressure regulator may ensure that at least a fluid being injected into reaction region of a modular plasma reactor 104 is maintained at or near atmospheric pressure. In some embodiments, the modular pressure regulator may be responsible for transferring the at least a fluid from at least a modular reservoir 112 to a modular injector 124, providing a consistent and controlled flow of the at least a fluid into reaction region of the modular plasma reactor 104.

With continued reference to FIG. 1, in some embodiments, a modular pressure regulator may be removably connected to at least a modular reservoir 112. In some cases, the modular pressure regulator may include a flow component removably connected with the at least a reservoir configured to flow at least a fluid from at least a fluid inlet of a modular injector 124 or outlet of at least a modular reservoir 112 to at least a fluid outlet of the modular injector 124. In some embodiments, the flow component may include a passive flow component configured to initiate a passive flow process. As used in this disclosure, a "passive flow component" is a component that imparts a passive flow on at least a fluid, wherein the "passive flow," for the purpose of this disclosure, is flow of fluid, which is induced absent any external actuators, fields, or power sources. A "passive flow process," as described herein, is a plurality of actions or steps taken on passive flow component in order to impart a passive flow on at least a fluid. In a non-limiting example, with the modular pressure regulator including the passive flow component, the modular injector 124 may be able to feed the at least a fluid through a reaction region as a function of the passive flow process. The passive flow component may employ one or more passive flow techniques in order to initiate passive flow process; for instance, and without limitation, the passive flow techniques may include osmosis, capillary action, surface tension, pressure, gravity-driven flow, hydrostatic flow, vacuums, and the like. The passive flow component may be in fluidic communication with the at least a modular reservoir 112.

With continued reference to FIG. 1, in other embodiments, a flow component may include an active flow component configured to initiate an active flow process. As used in this disclosure, an "active flow component" is a component that imparts an active flow on a fluid, wherein the "active flow," for the purpose of this disclosure, is flow of fluid which is induced by external actuators, fields, or power sources. An "active flow process," as described in this disclosure, is a plurality of actions or steps taken on active flow component in order to impart active flow on at least a fluid. In some embodiments, the active flow component may be electrically connected to a power source. In some embodiments, the power source may be controlled by a controller 120, where the controller 120 may control a power to the active flow component of the modular pressure regulator. In a non-limiting example, with a modular pressure regulator including the active flow component, a modular injector 124 may be able to feed at least a fluid through the reaction region as a function of the active flow process. Atmospheric pressure system may be configured to pressurize the at least a fluid entering the reaction region of a modular plasma reactor 104; for instance, and without limitation, active flow component of the modular pressure regulator may include one or more pumps. The pump may include a substantially constant pressure pump (e.g., centrifugal pump) or a substantially constant flow pump (e.g., positive displacement pump, gear pump, and the like). The pump can be hydrostatic or hydrodynamic. As used in this disclosure, a "pump" is a mechanical source of power that converts mechanical power into fluidic energy. The pump may generate flow with enough power to overcome pressure induced by a load at a pump outlet. The pump may generate a vacuum at a pump inlet, thereby forcing fluid from a reservoir into the pump inlet to the pump and by mechanical action delivering this fluid to a pump outlet. Hydrostatic pumps are positive displacement pumps. The hydrodynamic pumps can be fixed displacement pumps, in which displacement may not be adjusted, or variable displacement pumps, in which the displacement may be adjusted. Exemplary non-limiting pumps include gear pumps, rotary vane pumps, screw pumps, bent axis pumps, inline axial piston pumps, radial piston pumps, and the like. The pump may be powered by any rotational mechanical work source, for example without limitation, an electric motor or a power take off from the power source. The pump may be in fluidic communication with at least a modular reservoir 112.

With continued reference to FIG. 1, in some embodiments, a modular pressure regulator may include a low-pressure compressor. For the purposes of this disclosure, a "low-pressure compressor" is a device or a component configured to provide pressure to at least a fluid of at least a reservoir. The low-pressure compressor may include a pneumatic compression device. In some embodiments, the low-pressure compressor may include a hydraulic, air, or other compressor. Further, the low-pressure compressor may be a piston compressor, diaphragm compressor, helical screw compressor, sliding vane compressor, scroll compressor, rotary lobe compressor, centrifugal compressor, and like. The low-pressure compressor may be configured to apply a pressure to the at least a fluid and/or a modular injector 124. In some embodiments, the low-pressure compressor may be configured to apply a pressure between 2 bars and 7 bars. In some embodiments, a controller 120 may be configured to control a power to the low-pressure compressor to output a pressure. In a non-limiting example, the controller 120 may be configured to control a power to the low-pressure compressor to output the pressure between 2 bars and 7 bars. In some embodiments, the low-pressure compressor may be automated. The low-pressure compressor may be automated to apply the pressure for a set period of time. As a non-limiting example, the controller 120 may include a timing component as described below, where the controller 120 may control the low-pressure compressor to apply the pressure for the set period of time using the timing component. In some embodiments, the low-pressure compressor may be configured to slowly apply an increasing pressure to the modular injector 124 and/or the at least a modular reservoir 112. In other embodiments, the low-pressure compressor may be automated to apply a constant pressure to the modular injector 124 and/or the at least a modular reservoir 112. As a non-limiting example, the low-pressure compressor may be driven by direct current (DC) electric power. In some embodiments, the low-pressure compressor may be driven by electric power having varying or reversing voltage levels, such as AC power as produced by an alternating current generator and/or inverter, or otherwise varying power, such as produced by a switching power source. Additional disclosure related to the low-pressure compressor may be found in U.S. patent application Ser. No. 18/222,135, filed on Jul. 14, 2023, entitled as "LOW PRESSURE INJECTION SYSTEM FOR A PLURALITY OF FLUIDS AND METHOD OF USE THEREOF," the entirety of which is incorporated by reference.

With continued reference to FIG. 1, an apparatus 100 includes a controller 120. For the purposes of this disclosure, a "controller" is an electronic device or system that manages and regulates operations related to a plasma reactor. In some embodiments, controller 120 may include a modular controller. For the purposes of this disclosure, a "modular controller" is a controller that can be removably connected to other modules. In some embodiments, the controller 120 may include a computing device configured to control various internal components as described above, such as, without limitation, the modular plasma reactor 104, a modular ignition unit 116, a modular injector 124, a modular pressure regulator, and the like. In some embodiments, the controller 120 may be configured to allow for a direct human interface and/or remote operation. In some embodiments, the controller 120 may include various communication protocols and interfaces to facilitate communication between the controller 120 and other components of the apparatus 100. In some embodiments, the controller 120 may be configured to control various aspects of a plasma reactor system, such as the power supply, gas flow rate, pressure, temperature, fluid volume, and other parameters that affect plasma generation and maintenance.

With continued reference to FIG. 1, a controller 120 may include any computing device as described in this disclosure, including without limitation a microcontroller, microprocessor, a programmable logic controller (PLC), digital signal processor (DSP) and/or system on a chip (SoC) as described in this disclosure. For the purpose of this disclosure, a "programmable logic controller" is a digital computer-based system used for automation and control of any system. In some embodiments, the PLC may be programmed using various programming languages to create a sequence of instructions that control components of an apparatus 100's operations. As a non-limiting example, the PLC may be programmed using ladder logic, function block diagrams, or the like. For example, and without limitation, the PLC may be programmed to control the fluid flow into a modular plasma reactor 104, adjust the power input to the components of the apparatus 100, regulate the temperature of the modular plasma reactor 104, and the like. Any computing device disclosed in the entirety of this disclosure may be consistent with the functions of the PIC. Computing device may include, be included in, and/or communicate with a mobile device such as a mobile telephone or smartphone. Controller 120 may include a single computing device operating independently, or may include two or more computing device operating in concert, in parallel, sequentially or the like; two or more computing devices may be included together in a single computing device or in two or more computing devices. Controller 120 may interface or communicate with one or more additional devices as described below in further detail via a network interface device. Network interface device may be utilized for connecting controller 120 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Controller 120 may include but is not limited to, for example, a computing device or cluster of computing devices in a first location and a second computing device or cluster of computing devices in a second location. Controller 120 may include one or more computing devices dedicated to data storage, security, distribution of traffic for load balancing, and the like. Controller 120 may distribute one or more computing tasks as described below across a plurality of computing devices of computing device, which may operate in parallel, in series, redundantly, or in any other manner used for distribution of tasks or memory between computing devices. Controller 120 may be implemented using a "shared nothing" architecture in which data is cached at the worker, in an embodiment, this may enable scalability of system 100 and/or computing device.

With continued reference to FIG. 1, a controller 120 may be designed and/or configured to perform any method, method step, or sequence of method steps in any embodiment described in this disclosure, in any order and with any degree of repetition. For instance, controller 120 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Controller 120 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, in some embodiments, a controller 120 is communicatively connected to one or more of a modular ignition unit 116 and a modular injector 124. In some embodiments, the controller 120 may be removably connected to a modular pressure regulator, or other components of an apparatus 100. In some embodiments, the controller 120 may be removably connected to the components of an apparatus 100 using wired or wireless connection, or any network or connection protocols disclosed in the entirety of this disclosure. In some embodiments, the controller 120 may be removably connected to the components of the apparatus 100 using a communication port. For the purposes of this disclosure, a "communication port" is a physical interface on a device that allows it to send and receive data to and from other devices or systems. In some embodiments, the controller 120 may be removably connected to the components of the apparatus 100 using Ethernet, RS-232, RS-485, Controller Area Network (CAN) bus, or the like. In some embodiments, the controller 120 may be in communication with the one or more of a modular ignition unit 116 and a modular injector 124. In some embodiments, the controller 120 may in communication with a modular pressure regulator, or other components of an apparatus 100. As a non-limiting example, the communication may include electric communication, fluidic communication, informatic communication, mechanic communication, and the like.

With continued reference to FIG. 1, in some embodiments, a controller 120 may be configured to receive at least a connection signal. For the purposes of this disclosure, a "connection signal" is a signal that indicates a connection between components of an apparatus. As a non-limiting example, the controller 120 may receive the at least a connection signal when a modular ignition unit 116 is removably connected to the modular plasma reactor 104. As another non-limiting example, the controller 120 may receive the at least a connection signal when a modular injector 124 is removably connected to the modular plasma reactor 104. As another non-limiting example, the controller 120 may receive the at least a connection signal when a modular reservoir 112 is removably connected to the modular injector 124.

With continued reference to FIG. 1, in an embodiment, a controller 120 may be configured to receive at least a connection signal from at least a sensor. For the purposes of this disclosure, a "sensor" is a device that produces an output signal for the purpose of sensing a physical phenomenon. For example, and without limitation, the at least a sensor may transduce a detected phenomenon, such as without limitation, temperature, voltage, current, pressure, speed, motion, light, moisture, and the like, into a sensed signal. The at least a sensor may output the sensed signal. As a non-limiting example, the at least a sensor may output at least a connection signal. The at least a sensor may include any computing device as described in the entirety of this disclosure and configured to convert and/or translate a plurality of signals detected into electrical signals for further analysis and/or manipulation. Electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. Any datum captured by the at least a sensor may include circuitry, computing devices, electronic components or a combination thereof that translates into at least an electronic signal configured to be transmitted to another electronic component. In a non-limiting embodiment, the at least a sensor may include a plurality of sensors comprised in a sensor suite. In one or more embodiments, and without limitation, the at least a sensor may include a plurality of sensors.

With continued reference to FIG. 1, in some embodiments, at least a sensor may include a proximity sensor. In some embodiments, the proximity sensor may be configured to generate at least a connection signal as a function of a connection between components of an apparatus 100. As used in this disclosure, a "proximity sensor" is a sensor that is configured to detect at least a phenomenon related to one of components of an apparatus being mated to another of components of an apparatus. "Mate," as used in this disclosure, is an action of attaching two or more components together. In some embodiments, the proximity sensors may be used to detect the presence of the components of the apparatus 100 and may send the at least a connection signal to a controller 120 indicating that the connection has been made. As a non-limiting example, the components of the apparatus 100 may include a connector, adapter, continuous conductor, fastener, port, or the like of a modular plasma reactor 104, modular ignition unit 116, modular injector 124, modular reservoir 112, controller 120, modular pressure regulator, and the like. Exemplary proximity sensor may include any sensor described in this disclosure, including without limitation a switch, a capacitive sensor, a capacitive displacement sensor, a doppler effect sensor, an inductive sensor, a magnetic sensor, an optical sensor (such as without limitation a photoelectric sensor, a photocell, a laser rangefinder, a passive charge-coupled device, a passive thermal infrared sensor, and the like), a radar sensor, a reflection sensor, a sonar sensor, an ultrasonic sensor, fiber optics sensor, a Hall effect sensor, and the like.

With continued reference to FIG. 1, in some embodiments, at least a sensor may include a flow sensor. For the purposes of this disclosure, a "flow sensor" is a sensor that measures a flow of a fluid. In an embodiment, the flow sensor may measure a volumetric flow rate. For the purposes of this disclosure, a "volumetric flow rate" refers to the volume of fluid that passes a measurement point over a period of time. In another embodiment, the flow sensor may measure a mass flow rate. For the purposes of this disclosure, a "mass flow rate" refers to the amount of mass of fluid that passes a specific point over a period of time. In some embodiments, the flow sensor may be configured to measure a speed of a flow. For the purposes of this disclosure, a "speed" of a flow refers to an indication of how fast a substance moves through a conduit from one place to another. In some embodiments, the flow sensor may be configured to measure a distance of a flow. For the purposes of this disclosure, a "distance" of a flow refers to a distance a substance moves over a period of time. In some embodiments without limitation, the flow sensor may include ultrasonic meter, electromagnetic meter, Karman vortex meter, paddlewheel meter, floating element meter, thermal meter, differential pressure types meter, and the like. Persons skilled in the art, upon reviewing the entirety of this disclosure, will be aware of various ways in which steps, sequences of steps, and/or processing tasks to detect the flow of fluids for the disclosure.

With continued reference to FIG. 1, in some embodiments, at least a sensor may include a force sensor. For the purposes of this disclosure, a "force sensor" is a sensor that that converts an input mechanical load, weight, tension, compression or pressure into an electrical output signal. As a non-limiting example, the force sensor may include a tension force sensor, compression force sensor, tension and compression force sensor, and the like. As another non-limiting example, the force sensor may include a strain gauge, load cell, piezoelectric sensor, capacitive sensor, magnetic sensor, and the like. In some embodiments, the force sensor may be configured to transform a pressure into an analogue electrical signal. In some embodiments, the force sensor may be configured to transform a force into a digital signal.

With continued reference to FIG. 1, in some embodiments, at least a sensor may include an electrical sensor. As described in this disclosure, an "electrical sensor" is a device that is configured to detect an electrical parameter associated with an electrical phenomena. Exemplary non-limiting electrical sensors include volt-meters, amp-meters, ohm-meters, multi-meters, oscilloscopes, and the like. In some embodiments, the at least a sensor may include other types of sensors to detect changes in other parameters that can indicate whether a connection of components of an apparatus 100 has been made.

With continued reference to FIG. 1, in another embodiment, a controller 120 may be configured to receive at least a connection signal from a switch. For the purposes of this disclosure, a "switch" is a type of electronic or mechanical component that is configured to detect and manage connections between individual modules. In some embodiments, the switch may be configured to detect the presence or absence of a physical connection between components of an apparatus 100. As a non-limiting example, the components of the apparatus 100 may be designed with connectors that includes the switch that detects when one component of the apparatus 100 is physically connected (or removably connected) to another component of the apparatus 100. Then, in a non-limiting example, the switch may send at least a connection signal to a controller 120 indicating the status of the connection.

With continued reference to FIG. 1, in another embodiment, a controller 120 may be configured to receive at least a connection signal from an electronic communication protocol. For the purposes of this disclosure, an "electronic communication protocol" is a set of rules and standards that define how electronic devices communicate with each other over a network or bus system. In some embodiments, the electronic communication protocol may be used to detect and confirm connections between components of an apparatus 100, control signals between components of an apparatus 100 and the controller 120, and the like. In some embodiments, the electronic communication protocol may include Modbus, Ethernet/IP, CAN, OLE for Process Control (OPC), Bluetooth, and the like.

With continued reference to FIG. 1, in some embodiments, a controller 120 may be configured to analyze a number of modules connected to a modular plasma reactor 104 using at least a connection signal. As a non-limiting example, the controller 120 may analyze a number of modules, such as but not limited to a modular ignition unit 116, modular injector 124, modular reservoir 112, controller 120, modular pressure regulator, and the like, removably connected to the modular plasma reactor 104 as a function of a number of the at least a connection signals from them. In some embodiments, the controller 120 may be configured to analyze which of the components of the apparatus 100 is connected to the modular plasma reactor 104 using the at least a connection signal. In some embodiments, the controller 120 may be configured to control power that is supplied to the components of the apparatus 100 as a function of the at least a connection signal. As a non-limiting example, the controller 120 may supply the power to the modular ignition unit 116 once the controller 120 receives the at least a connection signal that indicates the modular ignition unit 116 is removably connected to the modular plasma reactor 104. As another non-limiting example, the controller 120 may supply the power to the modular injector 124 once the controller 120 receives the at least a connection signal that indicates the modular injector 124 is removably connected to the modular plasma reactor 104. As another non-limiting example, the controller 120 may supply the power to the modular pressure regulator once the controller 120 receives the at least a connection signal that indicates the modular pressure regulator is removably connected to the modular injector 124.

With continued reference to FIG. 1, a controller 120 may be in communication with a modular ignition unit 116. In some embodiments, the controller 120 may send ignition commands to the modular ignition unit 116, for example by way of ignition command signals. "Ignition command signal," as used in this disclosure, is a signal representing an ignition command. "Ignition command," as used in this disclosure, is a communication intended for a modular ignition unit. In some cases, the ignition command may be used to affect performance of the modular ignition unit 116. As a non-limiting example, the ignition command may be configured to control amount of power of the modular ignition unit 116. In some cases, the controller 120 may receive ignition data from the modular ignition unit 116, for example by way of ignition data signals. As used in this disclosure, a "ignition data signal" is a signal representing ignition data. As used in this disclosure, "ignition data" is information associated with a modular ignition unit. In some cases, ignition data may represent performance and/or operation of the modular ignition unit 116.

With continued reference to FIG. 1, a controller 120 may be in communication with a modular injector 124. In some embodiments, the controller 120 may send ignition commands to the modular injector 124, for example by way of injector command signals. "Injector command signal," as used in this disclosure, is a signal representing an injector command. "Injector command," as used in this disclosure, is a communication intended for a modular injector unit. In some cases, the injector command may be used to affect performance of the modular injector 124. As a non-limiting example, the injector command may be configured to configured to control the modular injector 124 to disperse at least a fluid in one of a plurality of fluid spray volumes. For example, and without limitation, the injector command may be configured to configured to control one or more valves of the modular injector 124 to disperse at least a fluid in one of a plurality of fluid spray volumes. For example, and without limitation, the injector command may be configured to control a flow adjustment component of the modular injector 124 to disperse at least a fluid in one of a plurality of fluid spray volumes. For the purposes of this disclosure, "fluid spray volume" is amount of fluid gets output from a modular injector. In some cases, the controller 120 may receive injector data from the modular injector 124, for example by way of injector data signals. As used in this disclosure, a "injector data signal" is a signal representing injector data. As used in this disclosure, "injector data" is information associated with a modular injector unit. In some cases, injector data may represent performance and/or operation of the modular injector 124.

With continued reference to FIG. 1, a controller 120 may be in communication with a modular pressure regulator. In some embodiments, the controller 120 may send pressure regulator commands to the modular pressure regulator, for example by way of pressure regulator command signals. "Pressure regulator command signal," as used in this disclosure, is a signal representing a pressure regulator command. "Pressure regulator command," as used in this disclosure, is a communication intended for a modular pressure regulator. In some cases, the pressure regulator command may be used to affect performance of the modular pressure regulator. As a non-limiting example, the pressure regulator command may be configured to control actuators, such as but not limited to an active flow component, of the modular pressure regulator. For example, and without limitation, the pressure regulator command may be configured to control a pump of the pressure regulator command. In some cases, the controller 120 may receive pressure regulator data from the modular pressure regulator, for example by way of pressure regulator data signals. As used in this disclosure, a "pressure regulator data signal" is a signal representing pressure regulator data. As used in this disclosure, "pressure regulator data" is information associated with a modular pressure regulator. In some cases, pressure regulator data may represent performance and/or operation of the modular pressure regulator. Additional disclosure related to the controller 120 may be found below.

With continued reference to FIG. 1, in some embodiments, a controller 120 may include a timing component. For the purposes of this disclosure, a "timing component" is a device or system used to control or synchronize the timing of various processes or operations of components of an apparatus. In some embodiments, the timing component is configured to regulate the timing of operations of the one or more of a modular ignition unit 116 and a modular injector 124. As a non-limiting example, the timing component may control the modular ignition unit 116 to supply electrical voltages between electrodes of a modular plasma reactor 104 for a set period of time. As another non-limiting example, the timing component may control the modular injector 124 to provide at least a fluid to reaction region of the modular plasma reactor 104 for the set period of time. In some embodiments, the set period of time may be predetermined. In some embodiments, the set period of time may be determined and input into the controller 120 by a user, where the user is any person that uses an apparatus 100. In some embodiments, the timing component may be configured to regulate the timing of operations of a modular pressure regulator. As another non-limiting example, the timing component may control the modular pressure regulator to control the pressure of at least a fluid for the set period of time.

Figure 2:
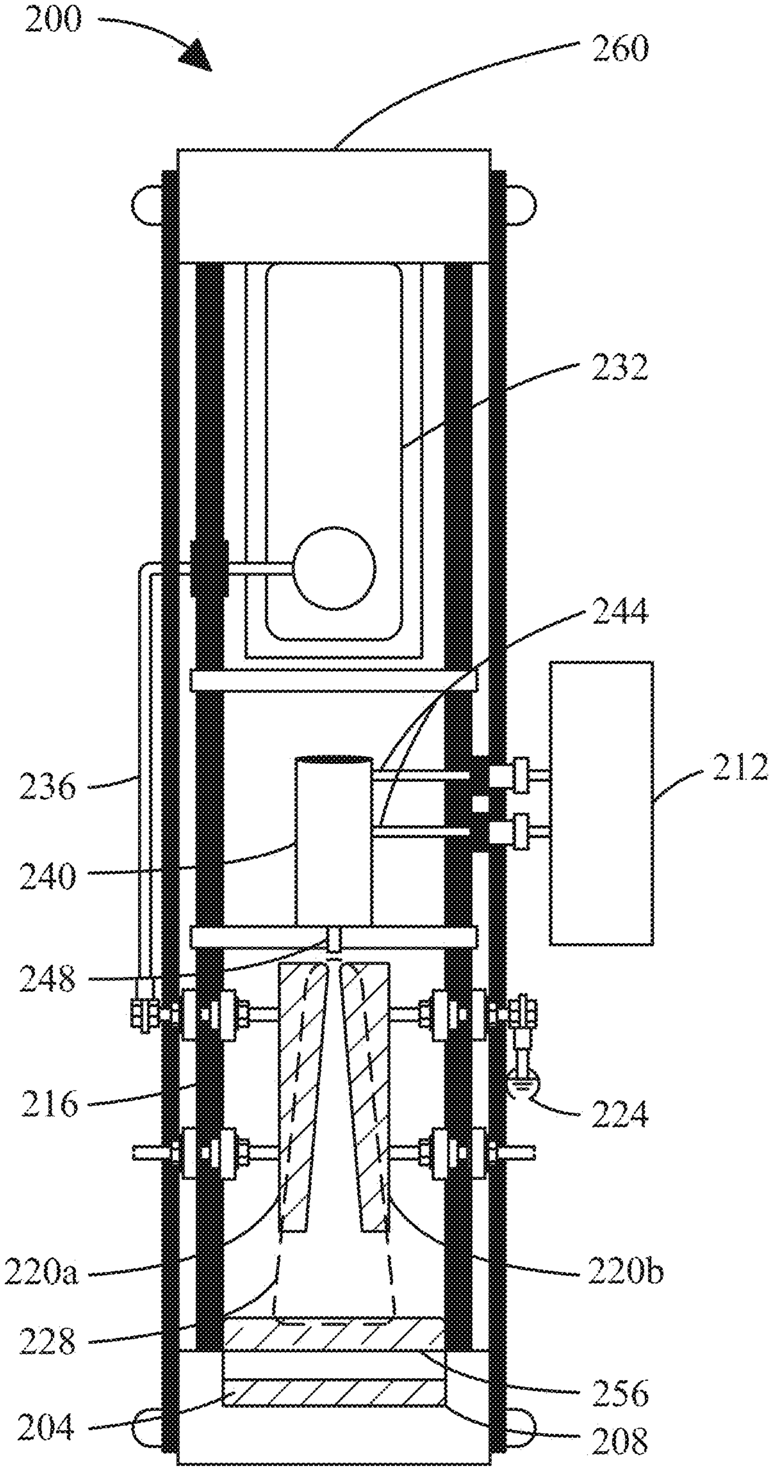
FIG. 2 illustrates an exemplary embodiment of an apparatus for treating a growth medium using an electrical discharge.

Now referring to FIG. 2, an exemplary embodiment of an apparatus 200 for treating a growth medium 204 using an electrical discharge is illustrated. In an embodiment, one or more seeds may be placed in growth medium 204. In some embodiments, seeds may include, without limitation, cereal seeds (e.g., wheat, rice, corn, barley, oats, millets, and the like), legume seeds (e.g., soybeans, peas, beans, lentils, chickpeas, peanuts, and the like), oilseeds (e.g., sunflower, rapeseed, flaxseed, sesame, safflower, and the like), vegetable seeds (e.g., tomatoes, peppers, cucumbers, eggplants, lettuce, spinach, and the like), and fruit seeds (e.g., watermelon, muskmelon, apple, citrus, and the like). In such an embodiment, growth medium 204 may include a nutrient-rich environment that provides the essential conditions for germination and growth of the seeds. In some cases, growth medium may provide environmental factors such as, without limitation, temperature, pH level, oxygen, and the like required for the seed to germinate and develop into a healthy plant. In a non-limiting example, growth medium 204 may include soil, wherein the soil may include a complex mixture of mineral particles, organic matter, water, air, living organisms, and the like. In another non-limiting example, growth medium 204 may include soilless mix or a specially formulated medium designed for seed germination and plant growth.

With continued reference to FIG. 2, apparatus 200 may include a treatment chamber 208 configured to contain growth medium 204. In an embodiment, treatment chamber 208 may be constructed as an open system; for instance, and without limitation, treatment chamber 208 may include an open-top container. In another embodiments, treatment chamber 208 may be constructed as a closed system; for instance, and without limitation, treatment chamber 208 may be an enclosed container with an airtight seal. In some embodiments, treatment chamber 208 may be designed to provide easy access to the growth medium 204 being treated. In a non-limiting example, treatment chamber 208 may include removable or hinged doors or ports for loading and/or unloading growth medium 204. In another non-limiting example, treatment chamber 208 may include one or more window with/without cover for visual inspection or sampling during the treatment process.

With continued reference to FIG. 2, apparatus 200 may include at least a reservoir 212. In some embodiments, the at least a reservoir 212 may be consistent with at least a modular reservoir 112 disclosed with respect to FIG. 1. In a non-limiting example, reservoir 212 may be configured to contain at least a fluid. Reservoir may provide a consistent and controlled supply of at least a fluid for the treatment of growth medium 204 as described in further detail below. In an embodiment, fluid may include a substance that enables the production of electrical discharge. In some cases, at least a fluid may include liquid; for instance, and without limitation, at least a fluid may include water, organic solvents, electrolyte solutions, and the like. In other cases, at least a fluid may include one or more gases; for instance, and without limitation, at least a fluid may include inert gases (e.g., nitrogen, argon, helium, neon, and the like), oxygen, carbon dioxide, air, reactive gases (e.g., hydrogen, ammonia, sulfur hexafluoride, and the like), and the like. Additionally, or alternatively, apparatus 200 may include a plurality of reservoirs. In an embodiment, at least a reservoir 212 may include a first reservoir configured to contain a first fluid and a second reservoir configured to contain a second fluid, wherein the first fluid may include at least a gas and the second fluid may include at least a liquid.

With continued reference to FIG. 2, at least a reservoir 212 may be constructed from materials that are compatible with at least a fluid being stored. For example, and without limitation, at least a reservoir 212 may be made from material such as corrosion-resistant metals, plastics, and/or glass. In some cases, at least a reservoir 212 may be appropriately sized to provide an adequate supply of fluid throughout the treatment process without frequent refilling or interruptions. At least a reservoir 212 may include at least an inlet, at least an outlet, or both. In a non-limiting example, at least an inlet may be used for filling at least a reservoir 212 with at least a fluid and at least an outlet may be connected to an injector or other fluid delivery component of apparatus 200 such as a pressure regulator as described in further detail below. At least a fluid may be input through the at least an inlet into at least a reservoir 212 and/or output through the at least an outlet to injector. In the case of apparatus 200 having a plurality of reservoirs, each reservoir of plurality of reservoirs may include at least an inlet and at least an outlet. In a non-limiting example, first reservoir configured to contain first fluid may include a first inlet and a first outlet, second reservoir configured to contain second fluid may include a second inlet and a second outlet, wherein the first inlet/first outlet may never intersect with second inlet/second outlet. In such embodiment, first fluid and second fluid may not contact each other before output through first outlet/second outlet.

With continued reference to FIG. 2, apparatus 200 may include a plasma reactor 216. In some embodiments, the plasma reactor 216 may be consistent with a modular plasma reactor 104 disclosed with respect to FIG. 1. Plasma may include a partially ionized gas consisting of a mixture of ions, electrons, and/or neutral particles (i.e., atoms and molecules). In an embodiment, plasma may be formed when at least a fluid subject to high-energy source, such as, without limitation, heat, radiation, electric filed, and the like, causing the atoms or molecules in at least a fluid to become ionized by losing or gaining electrons. At least a fluid may be inputted into plasma reactor 216 using injector as described below in this disclosure. In some cases, plasma may include non-thermal plasma (NTP), wherein the non-thermal plasma is a type of plasma in which the electron temperature is significantly higher than the temperature of the heavier ions and neutral particles. In this case, while the electrons in plasma have high kinetic energy, the overall temperature of at least a fluid may remain relatively low (e.g., often near room temperature of 30-32 C/88-92 F). Additionally, or alternatively, the energy distribution among particles within non-thermal plasma may not be in thermal equilibrium due to the electrons, being much lighter than ions and neutral particles, may gain energy more rapidly when subjected to an electric or magnetic field, leading to a higher electron temperature. On the other hand, heavier ions and neutral particles may move more slowly and remain cooler, resulting in low temperature of at least a fluid.

With continued reference to FIG. 2, plasma reactor 216 may include at least a pair of electrodes 220*a-b*, wherein the at least a pair of electrodes may include a first electrode 220*a* and a second electrode 220*b*. As used in this disclosure, an "electrode" is a conductor that is used to make electrical contact with a conductive medium and/or a medium that can become conductive given a sufficient voltage differential, such as at least a fluid as described above. At least a pair of electrodes 220*a-b* may be configured to produce an electrical discharge as a function of at least a fluid. As used in this disclosure, an "electrical discharge" refers to a phenomenon where an electric current flows between two or more conductive surfaces (i.e., at least a pair of electrodes 220*a-b*) through at least a fluid, causing ionization and the subsequent release of energy in the form of light, heat, or sound. In a non-limiting example, at least a pair of electrodes 220*a-b* may receive a voltage, supplied by an ignition unit as described in further detail below, wherein the voltage may be applied across the surface of at least a pair of electrodes 220*a-b*, creating an electric field between first electrode 220*a* and second electrode 220*b*. Such electric field may accelerate free electrons and other charged particles in at least a fluid, initiating a cascade of ionization event, thereby resulting in a formation of a conductive channel of charged particles (i.e., plasma) such as ions and electrons that allow electric current to flow between first electrode 220*a* and second electrode 220*b*.

With continued reference to FIG. 2, each electrode of at least a pair of electrodes 220*a-b* may be constructed from a metal or a metal alloy such as copper that has certain electrical conductivity and capability to withstanding high temperatures and chemical reactions. In an embodiment, at least a pair of electrodes 220*a-b* may include at least a cathode and at least an anode. A "cathode," for the purpose of this disclosure, is an electrode that is negatively charged in an electrical circuit, while an "anode," for the purpose of this disclosure, is an electrode that is positively charged in the electrical circuit. In some cases, at least a cathode may be an electrode where reduction occurs (i.e., meaning that it gains electrons) and at least an anode may be an electrode where oxidation occurs (i.e., meaning that it loses electrons). In a non-limiting example, first electrode 220*a* may include anode electrically connected to ignition unit as described above and second electrode 220*b* may include cathode electrically connected to a ground 224. As used in this disclosure, a "ground" is a common reference point or a conductive path that provides a baseline for measuring voltages, a return path for electric currents, and a means for safely dissipating excess electrical energy. Ground 224 may be connected to an earth's conductive surface or otherwise directly or through a grounding electrode conductor. Such connection may establish a reference voltage level (i.e., zero volts), against which other voltages within apparatus 200 may be measured. Additionally, or alternatively, ground 224 may provide a pathway for excess electrical energy to safely dissipate into the earth, reducing the risk of electrical shock, fires, or equipment damage of apparatus 200.

With continued reference to FIG. 2, plasma reactor 216 may include a reaction region 228 disposed between first electrode 220*a* and second electrode 220*b*, wherein the reaction region 228 is configured to enable an interaction between electrical discharge (i.e., plasma) and growth medium 204. As used in this disclosure, a "reaction region" is a designated area or space within plasma reactor 216 where specific chemical or physical reactions take place. In some embodiments, generating plasma in reaction region may include generating reactive oxygen species (ROS) and reactive nitrogen species (RNS), wherein both species are highly reactive molecules primarily formed through an interaction of molecular oxygen (O2) and molecular nitrogen (N2) with high-energy species, such as free radicals, ions, and/or electrons generated through electrical discharge as described above. In some cases ROS may include, without limitation, superoxide (O2.−), hydroxyl radical (.OH), hydrogen peroxide (H2O2). Plasma may collide with O2 molecules, causing dissociation, ionization, or excitation, which subsequently leads to the formation of ROS through further reactions. In some cases, RNS may include, without limitation, nitric oxide (.NO), nitrogen dioxide (.NO2), peroxynitrite (ONOO−), and the like. Plasma may collide with N2 molecules or other nitrogen-containing molecules, causing dissociation, ionization, or excitation, which subsequently leads to the formation of RNS through further reactions.

With continued reference to FIG. 2, ROS and RNS may drive various chemical and physical reactions within reaction region 228 of plasma reactor 216 during the treatment process. In an embodiment, ROS and RNS may readily participate in oxidation and reduction reactions; for instance, and without limitation, ROS and RNS may oxidize organic compounds, reducing stability of the organic compounds, and leading to their degradation or modification. In another embodiment, ROS and RNS may effectively inactivate or kill microorganisms such as bacteria, viruses, fungi, and the like; for instance, and without limitation, ROS and RNS may damage microorganisms' cellular structures and disrupting their metabolic functions by attacking cell wall, cell membrane, proteins, nucleic acids, and the like. In a further embodiment, ROS and RNS may modulate cellular processes such as cell signaling, gene expression, immune response and the like in both prokaryotic and eukaryotic cells; for instance, and without limitation, in low concentrations, ROS and RNS may act as signaling molecules that regulate cellular functions, while at higher concentrations, they may induce cellular stress, damage, or apoptosis. In other embodiments, ROS and RNS may also react with other molecules or species to generate secondary reactive species.

In a non-limiting example, and continue referring to FIG. 2, reaction region 228 may include a space between first electrode 220*a* and second electrode 220*b* where the electrical charge takes place and plasma is generated as a function of at least a fluid. In an embodiment, reaction region 228 may include a gap between at least a pair of electrodes 220*a-b*, wherein first electrode 220*a* may be parallel to second electrode 220*b* (i.e., in a corona discharge). In another embodiment, reaction region 228 may include a cylindrical space within a coaxial electrode arrangement. In a non-limiting example, at least a pair of electrodes 220*a-b* may be arranged in a diverging configuration (i.e., in a gliding arc discharge). First electrode 220*a* may be configured to diverge from second electrode 220*b* in diverging configuration; for instance, and without limitation, first electrode 220*a* and second electrode 220*b* may be slightly tilted. At least a pair of electrodes 220*a-b* may include an air gap in between first electrode 220*a* and second electrode 220*b*, wherein the air gap may be narrow on one end and gradually widen towards another end. For example, and without limitation, first electrode 220*a* may be closer together at one end and further apart at other end. In some cases, each electrode of at least a pair of electrodes 220*a-b* may include various shapes, such as, without limitation, linear, curved, spiral, and the like. In some cases, each electrode of at least a pair of electrodes 220*a-b* may be placed symmetrically on both sides of plasma reactor 216 along the fluid output axis of fluid outlet of injector as described below. The distance between first electrode 220*a* and second electrode 220*b* may be adjusted to control the intensity of electrical discharge.

Further referring to FIG. 2, in some embodiments, reaction region 228 may include a plurality of points of arc between first electrode 220*a* and second electrode 220*b*. As used in this disclosure, a "point of arc" refers to a flow of electrons between first electrode 220*a* and second electrode 220*b*. In some cases, point of arc may mark a starting point of electrical discharge. In some cases, position of point of arc may be influenced by various factors such as geometry and material of at least a pair of electrodes 220*a-b*, distance between first electrode 220*a* and second electrode 220*b* within at least a pair of electrodes 220*a-b*, received voltage, properties of at least a fluid, and the like. In a non-limiting example, point of arc may include a region where the electrical current "jumps" or "arcs" from first electrode 220*a* to electrode 220*b*. A first point of arc may be formed at the narrowest gap between first electrode 220*a* and second electrode 220*b*. First point of arc may include electrical field that is most intense. As plasma is generated by plasma reactor 216 through electrical discharge, first point of arc may move along the surface of at least a pair of electrodes 220*a-b* due to the influence of the electric field and the flow of at least a fluid. Such movement may introduce the rest of plurality of points of arcs along the surface of at least a pair of electrodes 220*a-b* and ensure a continuous, non-equilibrium plasma that enhances the generation of ROS and/or RNS described above.

With continued reference to FIG. 2, apparatus 200 may include an ignition unit 232 electrically connected to at least an electrode of at least a pair of electrodes 220*a-b*. In some embodiments, the ignition unit 232 may be consistent with a modular ignition unit 116 disclosed with respect to FIG. 1. In a non-limiting example, ignition unit is configured to supply an electrical voltage to at least an electrode. At least an electrode may include first electrode 220*a* (i.e., anode), Ignition unit 232 may include a power source. Power source may provide electrical power to ignition unit 232 and/or other devices/components within apparatus 200 described in this disclosure, such as, without limitation, plasma reactor 216, injector, any computing device and/or the like. In a non-limiting example, apparatus 200 may be electrically connected to a power source. In some embodiments, power source may be externally electrically connected to apparatus 200. In such embodiment, power source may include an external power source such as, without limitation, a wall outlet. In some cases, transmitting electric power may include using one or more continuous conductor 236. Electrically conductive material may include any material that is conductive to electrical current and may include, as a nonlimiting example, various metals such as copper, steel, or aluminum, carbon conducting materials, or any other suitable conductive material. In some embodiments, the power source may include a battery. A "battery," for the purposes of this disclosure, is a source for electric power including one or more electrochemical cells. An "electrochemical cell," for the purposes of this disclosure, is a device that generates electrical energy from the chemical reactions occurring in the cell.

With continued reference to FIG. 2, in some embodiments, ignition unit 232 may be configured to convert a lower input voltage (e.g., 210V/320V for AC voltages or 22V/34V for DC voltages) from power source into a higher output voltage, thereby providing necessary electrical energy to drive plasma reactor 216. In a non-limiting example, ignition unit 232 may include an ignition transformer. In some cases, electrical transformer may be used to increase or decrease the voltage levels of alternating current (AC) electrical signal while maintaining the same frequency. In a non-limiting example, ignition transformer may be configured to step up the input voltage from a lower level (from power source) to a higher voltage level required by plasma reactor 216 to create an electrical arc (i.e., point of arc). In some embodiments, ignition transformer may include two sets of windings, wherein the two sets of windings may include a primary winding and a secondary winding. Two sets of windings may be wound around a magnetic core. In some cases, primary winding may be connected to lower voltage input, while secondary winding may generate high voltage output. In a non-limiting example, ignition unit 232 may include ignition transformer configured to converts electrical power received from power source into a high-voltage discharge of 6 kV to 30 k. In another embodiment, the voltage range may be 3 kV to 18 k.

With continued reference to FIG. 2, in some embodiments, ignition unit 232 may be capable of converting AC voltage, which oscillates periodically between positive and negative values, into direct current (DC), which has a constant polarity (positive or negative) and does not change over time, for connected electrodes to produce a controlled and/or stable electrical discharge to generate and/or maintain the plasma. In some cases, apparatus 200 may need to convert AC to DC power supply to perform a pulsed operation. During the pulse plasma operation, plasma reactor 216 may operate in a pulsed mode, where the plasma may be generated and sustained for short periods followed by a period of no electrical discharge. DC power supply may be easily controlled and switched on and off as required, thereby making it suitable for pulsed plasma operation. In some cases, apparatus 200 may convert AC to DC power supply to reduce electrode wear and contamination; for instance, and without limitation, in AC-powered plasma reactor 216, the constantly changing polarity of electrodes may lead to accelerated electrode wear and the release of electrode material into the generated plasma. By using a DC power supply, the electrodes may maintain a constant polarity, reducing wear and contamination and increasing lifetime of the electrodes. In a non-limiting example, ignition unit 232 may include a rectifier. Rectifier may be built using one or more diodes, wherein the diodes are semiconductor devices that allow electrical current to flow in only one direction and have a low resistance to electrical current flow in the forward direction (when the voltage is positive) and a high resistance to electrical current flow in the reverse direction (when the voltage is negative). In some cases, rectifier may include, without limitation, half-wave rectifier, full-wave rectifier, and the like.

With continued reference to FIG. 2, in some embodiments, ignition unit 232 may include a power regulator (i.e., filter). In a non-limiting example, power regulator may be used to remove or attenuate unwanted frequencies, noise, or voltage fluctuations from the output voltage or current. Power regulator may include, without limitation, passive filter, active filter, EMI/RFI filter, voltage regulator, and the like. Additionally, or alternatively, ignition unit 232 may include a balancer. Persons skilled in the art, upon reviewing the entirety of this disclosure, will be aware of various devices/components that may be used within ignition unit 232 of apparatus 200.

With continued reference to FIG. 2, apparatus 200 may include an injector 240 in fluidic connection with at least a reservoir 212. In some embodiments, the injector 240 may be consistent with a modular injector 124 disclosed with respect to FIG. 1. In a non-limiting example, injector 240 may be configured to feed at least a fluid through reaction region. At least a fluid may then be used by the plasma reactor 216 to generate plasma. In a non-limiting example, fluidic connection between injector 240 and at least a reservoir 212 may be established using various components such as, without limitation, tubes, pipes, hoses, channels, or the like to create a continuous pathway for the flow of at least a fluid.

With continued reference to FIG. 2, injector 240 may include at least a fluid inlet 244. In a non-limiting example, at least a fluid inlet 244 may be connected with outlet of at least a reservoir 212 as described above. In some cases, at least a fluid inlet 244 may be designed to provide a secure, leak-free connection with the at least reservoir; for instance, and without limitation, at least a fluid inlet 244 may be sealed using one or more sealing elements such as O-rings, gaskets, thread sealants, and the like to ensure a tight seal and/or prevent leaks or contamination. Injector 240 may include at least a fluid outlet 248. In some cases, at least a fluid outlet 248 may be configured to allow at least a fluid to be released into the intended location within reaction region 228. For example, and without limitation, at least a fluid outlet 248 may be placed at the center and right above at least a pair of electrodes 220*a-b*. At least a fluid outlet 248 may be in a distance with at least a pair of electrodes 220*a-b* or reaction region 228. Such distance may impact the time and space available for at least a fluid to mix and interact with the plasma or other process components. In some cases, at least a fluid outlet 248 may be configured to provide an optimal flow pattern and dispersion of the at least a fluid into reaction region 228. In a non-limiting example, at least a fluid outlet 248 may include a nozzle (i.e., a specially-shaped opening) designed to create a directed, high-velocity stream of at least a fluid, which may improve mixing and dispersion in reaction region 228. Such nozzle may include, without limitation, swirl nozzle, fan spray nozzle, impinging jet nozzle, multi-hole nozzle, atomizing nozzle, and the like.

Additionally, or alternatively, and with continued reference to FIG. 2, injector 240 may include one or more valves configured to monitor, control, or otherwise regulate the flow of at least a fluid fed through reaction region 228 of plasma reactor 216. Exemplary non-limiting valves include directional valves, control valves, selector valves, multi-port valves, check valves, and the like. Valves may include any suitable valve construction including ball valves, butterfly valves, needle valves, globe valves, gate valves, wafer valves, regulator valves, and the like. Valves may be included in a manifold of hydraulic or pneumatic circuit, for example allowing for multiple ports and flow paths. Valves may be actuated by any known method, such as without limitation by way of hydraulic, pneumatic, mechanical, or electrical energy. For instance, in some cases, a valve may be actuated by an energized solenoid or electric motor. Valve actuators and thereby valves themselves, may be controlled by computing device as described in further detail below. Computing device may be in communication with valve, for example by way of one or more of electrical communication, hydraulic communication, pneumatic communication, mechanical communication, and the like. Further, injector 240 and elements thereof will be explained in greater detail below in this disclosure.

With continued reference to FIG. 2, apparatus 200 may include a pressure regulator 252 configured to transfer at least a fluid to injector. In an embodiment, pressure regulation system may include an atmospheric pressure system. In some embodiments, pressure regulator 252 may ensure that at least a fluid being injected into reaction region 228 of plasma reactor 216 is maintained at or near atmospheric pressure. In some embodiments, pressure regulator 252 may be responsible for transferring the fluid from at least a reservoir 212 to injector 240, providing a consistent and controlled flow of at least a fluid into reaction region 228 of plasma reactor 216.

With continued reference to FIG. 2, in some cases, pressure regulator 252 may include a flow component connected with at least a reservoir 212 configured to flow at least a fluid from at least a fluid inlet 244 of injector 240 or outlet of at least a reservoir 212 to at least a fluid outlet 248 of injector 240. In some embodiments, flow component may include a passive flow component configured to initiate a passive flow process. In a non-limiting example, with pressure regulator 252 including passive flow component, injector 240 may be able to feed at least a fluid through reaction region 228 as a function of passive flow process. Passive flow component may employ one or more passive flow techniques in order to initiate passive flow process; for instance, and without limitation, passive flow techniques may include osmosis, capillary action, surface tension, pressure, gravity-driven flow, hydrostatic flow, vacuums, and the like. Passive flow component may be in fluidic communication with at least a reservoir 212.

With continued reference to FIG. 2, in other embodiments, a flow component may include an active flow component configured to initiate an active flow process. In some embodiments, active flow component may be electrically connected to power source as described above. In a non-limiting example, with pressure regulator 252 including active flow component, injector 240 may be able to feed at least a fluid through reaction region 228 as a function of active flow process. Atmospheric pressure system 252 may be configured to pressurize at least a fluid entering reaction region 228 of plasma reactor 216; for instance, and without limitation, active flow component of pressure regulator 252 may include one or more pumps. Pump may include a substantially constant pressure pump (e.g., centrifugal pump) or a substantially constant flow pump (e.g., positive displacement pump, gear pump, and the like). Pump can be hydrostatic or hydrodynamic. A pump may generate flow with enough power to overcome pressure induced by a load at a pump outlet. A pump may generate a vacuum at a pump inlet, thereby forcing fluid from a reservoir into the pump inlet to the pump and by mechanical action delivering this fluid to a pump outlet. Hydrostatic pumps are positive displacement pumps. Hydrodynamic pumps can be fixed displacement pumps, in which displacement may not be adjusted, or variable displacement pumps, in which the displacement may be adjusted. Exemplary non-limiting pumps include gear pumps, rotary vane pumps, screw pumps, bent axis pumps, inline axial piston pumps, radial piston pumps, and the like. Pump may be powered by any rotational mechanical work source, for example without limitation, an electric motor or a power take off from power source. Pump may be in fluidic communication with at least a reservoir 212.

With continued reference to FIG. 2, apparatus 200 may further include a condenser 256 disposed within reaction region above treatment chamber. As used in this disclosure, a "condenser" is a component configured to collect reactive products generated from electric discharge within reaction region 228 of plasma reactor 216. In some embodiments, condenser 256 may be strategically placed between reaction region 228 configured to collect reactive products before they come into contact with growth medium 204 contained in treatment chamber 208. In some cases, reactive products may include ions, free radicals, electrons, excited molecules, and the like as described above; for instance, and without limitation, ROS and/or RNS. In other cases, reactive products may include byproducts or waste products produced during the treatment process. In a non-limiting example, reactive products may include carbon monoxide (CO) and/or carbon dioxide (CO2), wherein these gases may be produced as a result of the decomposition of growth medium 204 or the reaction of electrical discharge with impurities in growth medium 204. Other exemplary byproducts or waste products may include, without limitation, ozone, volatile organic compounds (VOCs), and the like.

With continued reference to FIG. 2, condenser 256 may include a cooling chamber. As used in this disclosure, a "cooling chamber" is a component configured to rapidly cool reactive products coming (i.e., falling) from reaction region 228 of plasma reactor. In some embodiments, cooling chamber may be configured to ensure efficient heat transfer and maintain optimal temperature conditions for the condensation process. Cooling chamber may be constructed from materials with thermal conductivity, such as, without limitation, copper, aluminum, stainless steel, and the like. In some cases, materials may be also chemically resistant to reactive products and at least a fluid used in the system. In some embodiments, cooling chamber of condenser 256 may be designed in a shape consistent with the shape of plasma reactor 216 or treatment chamber 208; for instance, and without limitation, cooling chamber may be designed in a cylindrical shape, consistent with the shape of plasma reactor 216 and treatment chamber 208 to optimize the flow of reactive products and maximize a contact surface area between a cooling medium and reactive products, wherein the cooling medium may include water, air, refrigerant, and/or the like configured to remove heat from reactive products efficiently. In some cases, interior of cooling chamber may be equipped with fins, coils, plates, and/or the like to further enhance the heat transfer process (i.e., by increasing the surface area of the cooling chamber). In a non-limiting example, cooling chamber may include a heat exchanger, wherein the heat exchanger may be configured to facilitate the transfer of heat from reactive products to the cooling medium.

With continued reference to FIG. 2, condenser 256 may include a collection surface. As used in this disclosure, a "collection surface" is a designated area within condenser 256 where reactive products come into contact with the cooling chamber and undergo a phase change, transitioning from a first state to a second state. In a non-limiting example, collection surface may be configured to enable reactive products in gaseous state to transit to liquid state. Such transition may allow apparatus 200 to efficiently collect and subsequently handle or transport condensed substances. In some embodiments, collection surface may include various surface features such as, without limitation, ridges, channels, and the like to facilitate the flow of condensed/collected substances. In a non-limiting example, collection surface may include a flat surface, wherein the flat surface may include a plurality of channels or grooves designed to facilitate the flow of condensed reactive products away from collection surface. Additionally, or alternatively, collection surface may include a surface finish; for instance, and without limitation, collection surface may be finished or treated (e.g., using hydrophobic coating, hydrophilic coating, and/or the like) to enhance the wetting properties and reduce surface tension, thereby improving condensation efficiency and fluid flow further.

With continued reference to FIG. 2, condenser 256 may include at least a conduit. As used in this disclosure, a "conduit" is a passageway for substances (i.e., condensed reactive products) to move from one location to another location within apparatus 200. In a non-limiting example, condenser 256 may use one or more conduits to transfer condensed reactive products from collection surface to growth medium 204 contained in treatment chamber 208. In some cases, conduit may be designed with a circular cross-sectional shape. In some cases, conduit may be thermally insulated to maintain a desired temperature of the condensed reactive products and/or prevent any unwanted chemical reactions during transport using material such as fiberglass. In some embodiments, one or more conduits may be connected to collection surface in a manner that ensures a leak-proof connection; for instance, and without limitation, such connection between collection surface and one or more conduits may be established using threaded fittings, compression fittings, flange, and the like. In some embodiments, one or more conduits may be routed from collection surface to treatment chamber 208 with minimized interference with other components of apparatus 200 to ensure a smooth flow of the condensed reactive products; for instance, and without limitation, proper support and/or anchoring of conduits may be installed to prevent conduits from sagging, vibrating, experiencing any other mechanical stress that could cause leaks or damages. Additionally, or alternatively, conduits may incorporate one or more valves to regulate the flow of condensed reactive products into treatment chamber 208. Valves may include any valves described in this disclosure. Persons skilled in the art, upon reviewing the entirety of this disclosure, will be aware of various devices/components that may be used within condenser 256 of apparatus 200.

With continued reference to FIG. 2, apparatus 200 may include a computing device configured to control various internal components as described above, such as, without limitation, plasma reactor 216, ignition unit 232, injector 240, condenser 256, and the like.

With continued reference to FIG. 2, apparatus 200 may include a housing 260 configured to house various internal components such as, without limitation, treatment chamber 208, plasma reactor 216, ignition unit 232, injector 240, pressure regulator 252, condenser 256, computing device, and the like thereof. In some embodiments, the housing 260 may be consistent with a housing 108 disclosed with respect to FIG. 1. In some cases, housing 260 may provide protection, stability, and/or organization to apparatus 200. In an embodiment, housing 260 may be designed to accommodate and securely hold internal components of apparatus 200. In some cases, housing 260 may include a plurality of layers, wherein one or more internal components of apparatus 200 may be strategically placed into each layer of plurality of layers, thereby minimizing physical or functional interference between internal components of apparatus 200. In a non-limiting example, housing 260 may include a first layer incorporating ignition unit 232, a second layer incorporating injector 240, a third layer incorporating plasma reactor 216, and a fourth layer incorporating treatment chamber 208 containing growth medium 204. Each layer may be physically isolated but functionally connected in various means (e.g., fluidic connection, electrical connection, and the like thereof); for instance and without limitation, continuous conductor 236 may be used to connect ignition unit 232 and at least an electrode of at least a pair of electrode 220*a-b* of plasma reactor 216 configured to transmit electrical power from first layer of housing 260 to third layer of housing 260, wherein continuous conductor may travel from first layer of housing 260 to third layer of housing 260 through second layer of housing 260 externally. For another instance, and without limitation, at least a fluid outlet 248 of injector 240 may be mechanically fixed to the bottom of second layer or top of third layer of housing 260, wherein the at least a fluid outlet 248 may include a first end connected to injector 240 and a second end extended into third layer of housing 260 that incorporates plasma reactor 216. In such embodiment, at least a fluid contained within at least a reservoir 212 may be introduced into plasma reactor 216 and further through reaction region 228 from second layer of housing 260 to third layer of housing 260. Additionally, or alternatively, housing 260 may include a proper insulation of the electrode wire (continuous conductor 236) configured to prevent electrical shorts or interference with other components in housing 260. In a non-limiting example, an insulator may be used at a point where continuous conductor 236 passes through housing 260, as described in further detail with reference to FIG. 3.

Now referring to FIG. 3, an exemplary embodiment of a plasma reactor assembly 300 is illustrated. Plasma reactor assembly 300 may include a housing 304. In an embodiment, housing 304 may be a portion of housing 260 as described above. In another embodiment, housing 304 may be a separate housing configured to only house plasma reactor 216. In a non-limiting example, plasma reactor 216 may be double-housed, wherein housing 304 may be disposed within third layer of housing 260 as illustrated in FIG. 2. At least a pair of electrodes 220*a-b* and reaction region 228 in between electrodes of at least a pair of electrodes 220*a-b* may be disposed within housing 304. In some cases, housing 304 may be injection molded via an injectable mold. As used in this disclosure, an "injectable mold" is a manufacturing tool for producing plastic parts. Manufacturing housing 304 may include using an injection molding process, wherein the injection molding process may involve a use of injectable mold configured to create specific shape and features of housing 304. In some embodiments, injectable mold may include two halves that are clamped together, with one or more cavities in between, wherein the cavities may define the shape of housing 304. In some cases, material such as, without limitation, molten plastic may be injected into the injectable mold under high pressure, filling the space and taking on the shape of injectable mold. Injection molding process may include a cooling process which is configured to cool and/or solidify injected material. Injectable mold may be then opened and finished housing 304 may be removed. In some embodiments, injectable mold may be precisely machined to desired shape and size of housing 304. In a non-limiting example, housing 304 may include a hollow cylinder.

With continued reference to FIG. 2, one or more continuous conductor 236*a-b* may pass through housing 304, with one end electrically connected to at least an electrode 308 of at least a pair of electrodes 220*a-b*. In some cases, at least an electrode 308 may include a first electrode 220*a*. In other cases, at least an electrode 308 may include second electrode 220*b*. Another end of continuous conductor 236*a-b* may be connected to ignition unit 232 or ground 224 as described above with reference to FIG. 2. In some embodiments, one or more insulators 312*a-b* may be used at the point where continuous conductor 236*a-b* passes through housing 304. An "insulator," for the purpose of this disclosure, is a material that does not readily conduct heat, electricity, or sound. In a non-limiting example, insulators 312*a-b* may include electrical insulators, wherein the electrical insulators are material that have high electrical resistivity. Electrical insulators may not readily conduct electric current, thereby preventing the flow of electricity between plasma reactor 216 with other components except ignition unit 232, reducing the risk of short circuits, electrical shocks, interference, and the like. Exemplary electrical insulator may include plastics, ceramics, glass, rubber, and the like.

With continued reference to FIG. 3, each electrode of the at least a pair of electrodes 220*a-b* may include a pitch angle 316. In a non-limiting example, at least an electrode 308 may include a pitch angle 316 of 22 degrees. As used in this disclosure, a "pitch angle" of an electrode refers to an angle between the electrode's longitudinal axis and a reference plane or axis within plasma reactor 216. In some cases, pitch angle 316 may impact on characteristics of plasma generated between electrodes in reaction region 228 such as, without limitation, electric field distribution, efficiency of electrical discharge process, interaction with reactive species (e.g., ROS, RNS, and the like) within the plasma.

With continued reference to FIG. 3, injector 240 may be connected to plasma reactor 216 via an injector mount flange 320. In a non-limiting example, injector mount flange 320 may include an interface 324 between injector 240 and plasma reactor 216. In some cases, at least a fluid outlet 248 of injector 240 may include a threaded adaptor. Both at least a fluid outlet 248 and interface 324 may include a threaded section; for instance, and without limitation, at least a fluid outlet 248/interface 324 may include a male/female threaded section, wherein the male and the female threaded section are compatible (i.e., matched). Injector 240 may be threaded, via at least a fluid outlet 248 with threaded adaptor onto injector mount flange 320 at interface 324.

Figure 4:
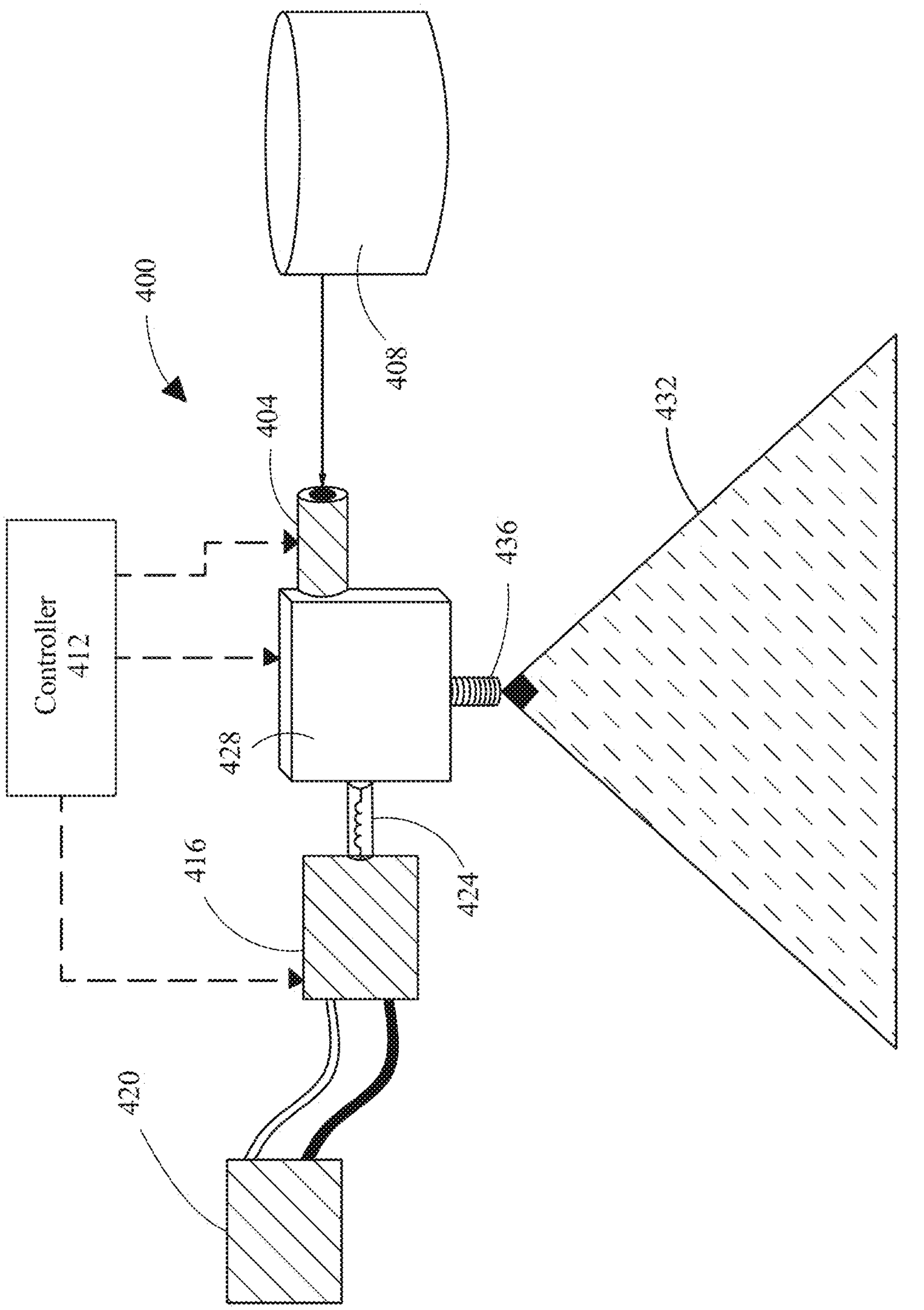
FIG. 4 illustrates an exemplary embodiment of a low pressure injection system for a plurality of fluids.

Now referring to FIG. 4, an exemplary embodiment of a vapor injection system 400 is presented. In an embodiment, system 400 includes a fluid conduit 404 in fluidic communication with a fluid reservoir 408. In an embodiment, fluid conduit 404 may receive a fluid from a fluid reservoir 408. A "fluid conduit," as used herein, is a system or device that allows the flow of a fluid. In some nonlimiting examples, fluid conduit 404 may include components such as, without limitation, tubes, pipes, hoses, channels, or the like to create a continuous pathway for the flow of a fluid. In embodiments, fluid reservoir 408 may include a plurality of reservoirs. In an embodiment, fluid reservoir 408 may be sealed to substantially prevent leaking of the fluid stored in the fluid reservoir 408. In some embodiments, fluid reservoir 408 may be vented to allow for free passage of some fluids, such as without limitation air, into and out of the fluid reservoir 408. In another embodiment, fluid reservoir 408 may be completely sealed. In embodiments, fluid reservoir 408 may include a storage reservoir. In an embodiment, fluid reservoir 408 may include a pressure reservoir, providing for a pressure difference between inside and outside of the reservoir. In some cases, a first fluid reservoir 408 may be insulated, for example to prevent electrical and/or thermal communication between inside and outside the reservoir. In an embodiment, at least one first fluid inlet 404 may be hydraulically connected to first fluid reservoir 408. In some embodiments, fluid conduit 404 may include a pump. In an embodiment, pump may be configured to unidirectionally pump fluid from fluid reservoir 408 to other components of vapor injection system 400. In some embodiments, the pump may include more than one pump and/or a number of valves. In an embodiment, the number of valves may comprise at least one check valve. As used in this disclosure, "check valve" is a one-way/nonreturn valve that opens with fluid movement and pressure and closes to prevent backflow of the fluid and/or pressure. In exemplary embodiment, check valve may be any of a ball check valve, swing check, tilting disc check valve, and the like It will be apparent to one of ordinary skill in the art, upon reading this disclosure, of the many ways that can be used to control the flow of fluids from fluid reservoir 408 to other components of vapor injection system 400.

With continued reference to FIG. 4, in some embodiments, fluid conduit 404 may include a fluidic circuit configured to direct fluid into components of vapor injection system 400. In an embodiment, fluidic circuit may be connected to a controller 412 configured to control flow of fluid from fluid reservoir 408 to other components of vapor injection system 400. The controller 412 disclosed herein may be consistent with a controller 120 disclosed with respect to FIG. 1.

With continued reference to FIG. 4, controller 412 may send pump commands to a pump, for example by way of pump command signals. "Pump command signal," as used in this disclosure, is a signal representing a pump command. "Pump command," as used in this disclosure, is a communication intended for any pump described herein. In some cases, pump command may be used to affect performance of the pump. In some embodiments, controller 412 may receive pump data from a pump connected to fluid conduit 404, for example by way of pump data signals. As used in this disclosure, a "pump data signal" is a signal representing pump data. As used in this disclosure, "pump data" is information associated with any pump described herein. In some cases, pump data may represent performance and/or operation of a pump.

With continued reference to FIG. 4, system 400 may include a voltage conditioner 416 connected to a power source 420. A "voltage conditioner," as used herein is a device capable of regulating voltage levels and frequency of an electrical current and converting current types. In some embodiments, voltage conditioner 416 may include a rectifier. An "inverter," as used herein, is a device or component configured to convert direct current (DC) to alternating current (AC). In an embodiment, voltage conditioner 416 may include a boost converter. A "boost converter," as used herein, is a device or component configured to increase voltage levels of a current. In an embodiment, voltage conditioner 416 is configured to receive electrical energy from the power source 420. In embodiments, power source 420 may include a power generator. In embodiments, power source 420 may include a power outlet connected to the power grid. In some embodiments, controller 412 may be connected to power source. In embodiments, voltage conditioner is further configured to transform the electrical energy. In some embodiments, transforming the electrical energy may include regulating voltage of the electrical energy. In further embodiments, transforming the electrical energy may include regulating voltage of the electrical energy to a range between 410 volts and 220 volts. In embodiments, transforming the electrical energy may include modifying frequency of the voltage. In further embodiments, transforming the electrical energy may include modifying frequency of the voltage to 20 kilohertz (kHz). In some embodiments, transforming the electrical energy may include modifying frequency of the voltage to 30 kilohertz (kHz). In a nonlimiting example, violate conditioner 416 may transform electrical energy by receiving AC electrical energy from power source 420, voltage conditioner 416 may convert the AC electrical energy to a DC electrical energy using a rectifier component, voltage conditioner 416 may then increase voltage to 220*v* using a boost converter component and then increase frequency to 20 kHz using an inverter component. It will be apparent to one of ordinary skill in the art, upon reading this disclosure, that component described in this disclosure are described as examples only and that voltage conditioner 416 may include many other components not described herein.

With continued reference to FIG. 4, in an embodiment, system 400 may include an iron core coil 424 connected to voltage conditioner 416. In an embodiment, iron core coil 424 may be configured to transmit transformed electrical energy from voltage conditioner 416. An "iron core coil," as used herein is a type of inductor or magnetic component, consisting of a coil of wire wound around an iron or ferromagnetic core, that resists changes to the current flowing through it. In a nonlimiting example, iron core coil 424 may transmit modified electrical energy from voltage conditioner 416.

With continued reference to FIG. 4, in an embodiment, system 400 includes a crystal compressor 428. A "crystal compressor," as used herein, is a piezoelectric device used to generate pressure variations or ultrasonic waves within a fluid. A "piezoelectric device," as used herein, is a device that uses piezoelectric materials, such as certain types of crystals that can change their shape and/or dimension when an electric voltage is applied, to generate oscillating pressure waves or ultrasonic vibrations. In some embodiments, crystal compressor 428 may be connected to iron core coil 424. In a nonlimiting example, iron core coil 424 may be used to connect voltage conditioner 416 and crystal compressor 428 as to maintain the properties of transformed electrical energy, such as set voltage and frequency, during transmission. In embodiments, crystal compressor 428 may be connected to fluid conduit 404. In some embodiments, crystal compressor 428 may be connected to voltage conditioner 416. In an embodiment, crystal compressor 428 may be configured to receive the transformed electrical energy from iron core coil 424. In embodiments, crystal compressor 428 may receive the transformed electrical energy from voltage conditioner 416. In embodiments, crystal compressor 428 may receive the fluid from the fluid conduit 404. In some embodiments, crystal compressor 428 may be communicatively connected to controller 412. In some embodiments, controller 412 may be a piezo controller. Piezo controller may include the "Open-Loop Piezo Controller" made by Thorlabs Inc., headquartered in Newton, New Jersey USA.

With continued reference to FIG. 4, in an embodiment, crystal compressor 428 generates vapor 432 as a function of the transformed electrical energy and the fluid. In a nonlimiting example, crystal compressor 428 may generate vapor 432, such as water vapor, through applying ultrasonic vibrations to a fluid, such as water. In some embodiments, crystal compressor outputs the vapor using a vapor outlet 436. A "vapor outlet," as used herein, is an exit point through which vapor is discharged. In a nonlimiting example, vapor outlet 428 may include a fog nozzle configured to output vapor. In some embodiments, vapor injection system 400 may be connected to a plasma reactor. In some embodiments, vapor injection system 400 may be further configured to output vapor to the plasma reactor. In an embodiment, plasma may be formed when a vapor subject to high-energy source, such as, without limitation, heat, radiation, electric filed, and the like, causing the atoms or molecules in a vapor to become ionized by losing or gaining electrons. In embodiments, vapor may be inputted into plasma reactor using vapor injector system 400. In some embodiments, plasma may include non-thermal plasma (NTP), wherein the non-thermal plasma is a type of plasma in which the electron temperature is significantly higher than the temperature of the heavier ions and neutral particles. In this case, while the electrons in plasma have high kinetic energy, the overall temperature of the vapor may remain relatively low (e.g., often near room temperature of 20-22 C/68-72 F). Additionally, or alternatively, the energy distribution among particles within non-thermal plasma may not be in thermal equilibrium due to the electrons, being much lighter than ions and neutral particles, may gain energy more rapidly when subjected to an electric or magnetic field, leading to a higher electron temperature. On the other hand, heavier ions and neutral particles may move more slowly and remain cooler, resulting in low temperature of vapor.

Figure 5:
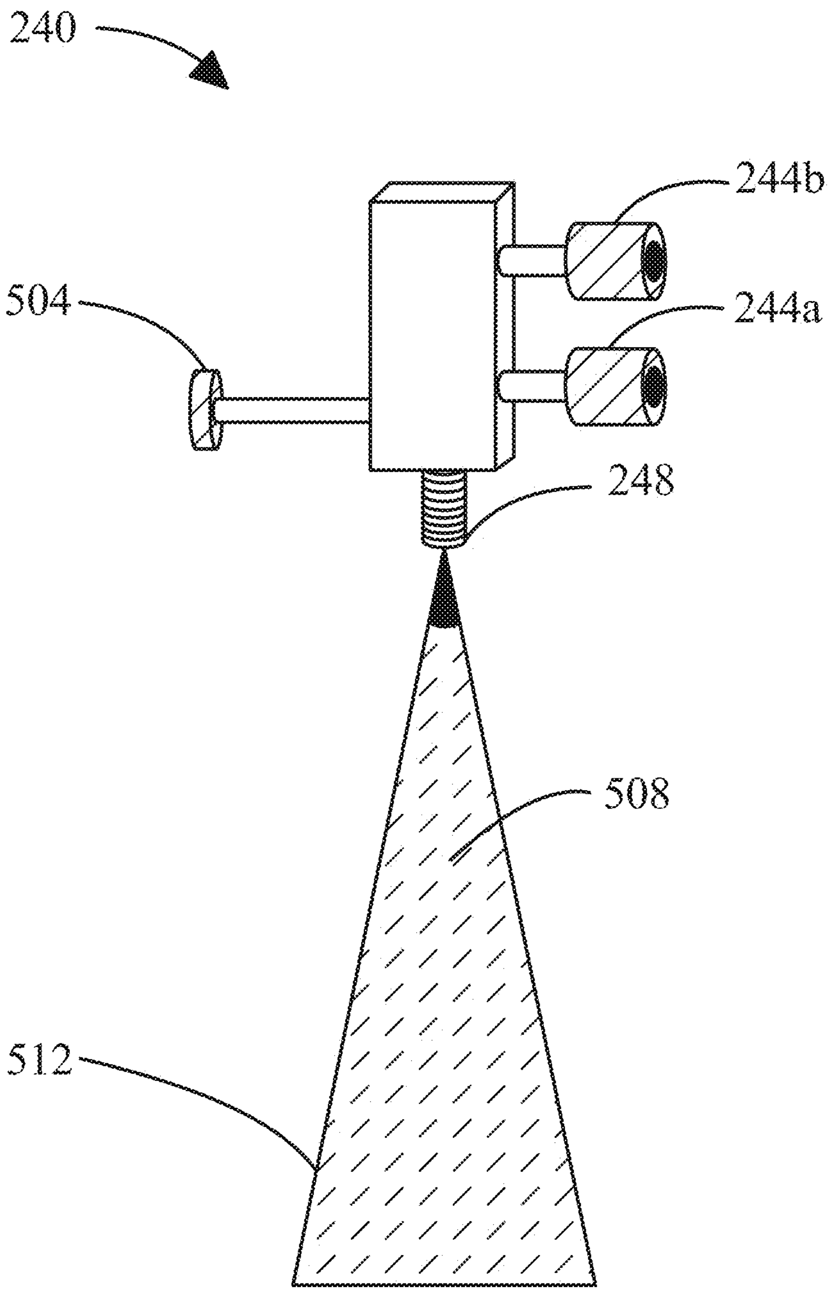
FIG. 5 illustrates an exemplary embodiment of an injector with a flow adjustment component.

Now referring to FIG. 5, an exemplary embodiment of an injector 240 with a flow adjustment component 504 is illustrated. In some embodiments, injector 240 may include a plurality of fluid inlets 244*a-b*. In a non-limiting example, injector 240 may include a first fluid inlet 244*a* in fluidic connection with first reservoir, wherein the first fluid inlet may be configured to accept first fluid from first reservoir. First fluid may include one or more gases as described above. Injector 240 may include a second fluid inlet 244*b* in fluidic connection with second reservoir, wherein second fluid inlet 244*b* may be configured to accept second fluid from second reservoir. Second fluid may include liquid such as, without limitation, water. In some cases, at least a fluid outlet 248 may be configured to output a mixture of first fluid and second fluid in a form of droplets to plasma reactor. In a non-limiting example, injector 240 may produce droplets through different mechanisms, such as, without limitation, pressure-driven atomization, ultrasonic atomization, electrostatic atomization, and the like. Injector 240 may break second fluid down into small droplets which may then be dispersed and mixed with first fluid. In some cases, droplets may carry reactants into reaction region 228 of plasma reactor 216. In some cases, droplets may enhance the mixing and interaction between different fluids or reactive species within plasma reactor, thereby improving the efficiency and/or uniformity of the treatment process.

With continued reference to FIG. 5, in some cases, flow adjustment component 504 may include a manual flow control valve which can be adjusted by hand to regulate the fluid flow rate through injector 240. In a non-limiting example, by turning a knob, valve opening or the opening of at least a fluid outlet 248 may be changed, allowing for more or less fluid to pass through injector 240 or introduce into plasma reactor 216. Additionally, or alternatively, flow adjustment component 504 may include an 8× turn-down ratio. Such flow adjustment component 504 may control fluid flow rate over a range of eight times the minimum flow rate. For example, if the minimum flow rate of flow adjustment component 504 is 2 gallon per minute (GPM), an 8× turn-down ratio may indicate that flow adjustment component 504 may be able to effectively regulate flow rates from 2 GPM up to 8 GPM. In a non-limiting example, at least a fluid outlet 248 of injector 240 may output gas & 7~8μ water drops 508 in a 22~25 degrees spray cone 512.

Figure 6:
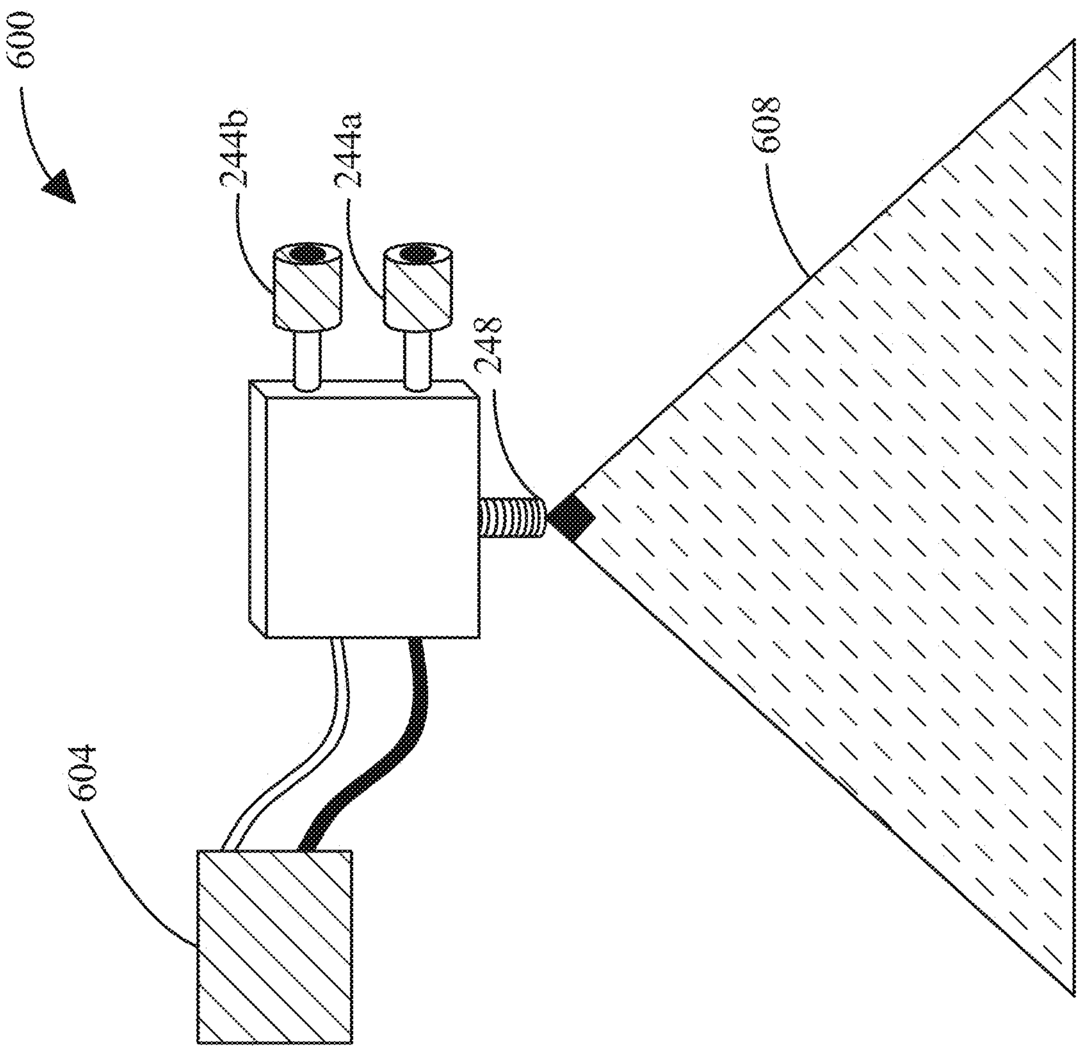
FIG. 6 illustrates an exemplary embodiment of a piezo water vapor injector.

Now referring to FIG. 6, an exemplary embodiment of a piezo water vapor injector 600 is illustrated. As used in this disclosure, a "piezo water vapor injector" is a type of injector 240 that utilizes piezoelectric technology to generate water vapor by atomizing at least a liquid (i.e., second fluid) into fine droplets as described above. "Water vapor," as described herein, is the gaseous phase of water (i.e., second fluid), which occurs when water molecules gain enough energy to break free from liquid state and become dispersed in surrounding air (i.e., first fluid). "Piezoelectric technology," as described herein, is a technology based on a piezoelectric effect: a phenomenon where certain materials generated an electric charge when subjected to mechanical stress or other way around (i.e., undergo mechanical deformation when exposed to electric field). In some cases, materials such as ceramics (e.g., lead zirconate titanate), quartz crystals, polymers, and the like may exhibit such effect. Piezo water vapor injector 600 may include a piezoelectric element; for instance, and without limitation, a ceramic disk or plate may be used to create mechanical vibrations at certain frequencies when an electrical voltage is applied by power source 604. Power source 604 may include any power source as described above in this disclosure such as a DC power supply. Mechanical vibrations may be transmitted to at least a fluid input from at least a fluid inlet (i.e., first fluid inlet 244*a* and/or second fluid inlet 244*b*), thereby causing at least a fluid to break up into fine droplets of mist, which then evaporate to form water vapor. In a non-limiting example, at least a fluid outlet 248 of piezo water vapor injector 600 may output at least 90 degrees water vapor and air discharge cone.

Figure 7:
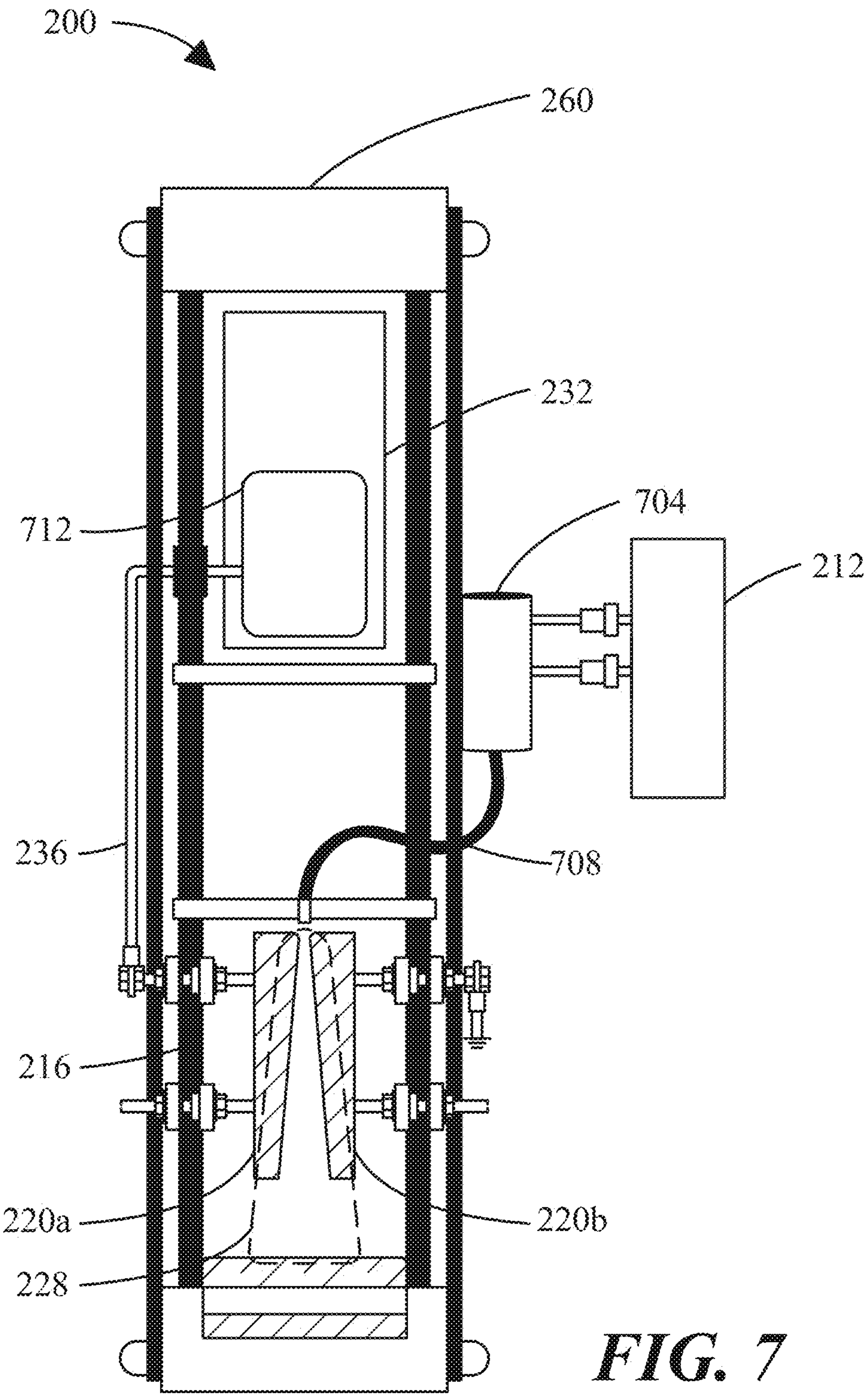
FIG. 7 illustrates an exemplary embodiment of an apparatus for treating a growth medium using an electrical discharge with an external mounted injector.

Now referring to FIG. 7, an exemplary embodiment of apparatus 200 for treating a growth medium via an electrical discharge with an external mounted injector 704 is illustrated. As used in this disclosure, an "external mounted injector" is an injector that is installed on the exterior of apparatus 200, rather than being integrated within apparatus 200 as described above with reference to FIGS. 2-6. External mounted injector 704 may include any injector as described above such as, without limitation, injector 240 (air & water injector), Piezo water vapor injector 600, and the like. In some embodiments, external mounted injector 704 may be designed to deliver at least a fluid from at least a reservoir 212 into plasma reactor 216 from an external location via a tube 708. In a non-limiting example, external mounted injector 704 may be mechanically fixed to the exterior of housing 260. In some cases, external mounted injector 704 may be attached to exterior of housing 260 via screw or bolt fastening, clamp or clip fastening, sliding or snap-fit connections, and/or the like.

Additionally, or alternatively, and with continued reference to FIG. 7, ignition unit 232 may include a coil 712. In a non-limiting example, coil 712 may be electrically connected to at least an electrode (i.e., first electrode 220*a*) of at least a pair of electrodes 220*a-b*, configured to initiate electrical discharge in plasma reactor 216. Coil may include an induction coil or a high-voltage transformer coil, wherein the induction coil or the high-voltage transformer coil may generate high-voltage electrical pulses necessary to create electrical discharge between first electrode 220*a* and second electrode 220*b*.

Figure 8:
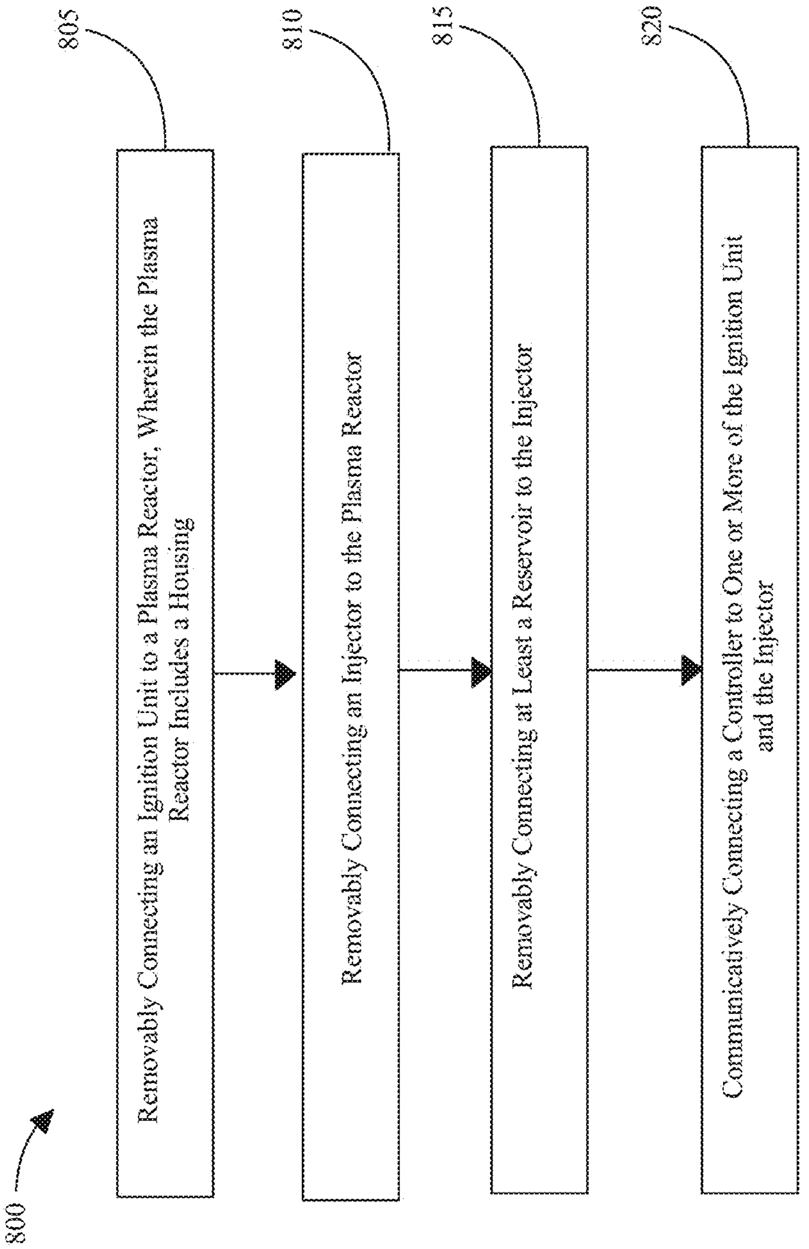
FIG. 8 is a flow diagram of an exemplary method of use for a modular plasma reactor.

Now referring to FIG. 8, a flow diagram of an exemplary embodiment of a method 800 for treating a growth medium via an electrical discharge is illustrated. The method 800 includes a step 805 of removably connecting a modular ignition unit to a modular plasma reactor, wherein the modular plasma reactor comprises a housing. In some embodiments, the modular ignition unit may include an inductive coil. This may be implemented, without limitation, as described above in reference to FIGS. 1-7.

With continued reference to FIG. 8, a method 800 includes a step 810 of removably connecting a modular injector to a modular plasma reactor. This may be implemented, without limitation, as described above in reference to FIGS. 1-7.

With continued reference to FIG. 8, a method 800 includes a step 815 of removably connecting at least a modular reservoir to a modular injector. In some embodiments, the method 800 may further include removably connecting a modular pressure regulator to the at least a modular reservoir. This may be implemented, without limitation, as described above in reference to FIGS. 1-7.

With continued reference to FIG. 8, a method 800 includes a step 820 of communicatively connecting a controller to one or more of a modular ignition unit and a modular injector. In some embodiments, the controller may include a programmable logic controller (PLC). In some embodiments, the method 800 may further include receiving, using the controller, a connection signal, wherein the connection signal indicates a connection between a modular plasma reactor and the one or more of the modular ignition unit, the modular injector and the modular pressure regulator. In some embodiments, the method 800 may further include controlling, using the controller, a low-pressure compressor of the modular pressure regulator to output a pressure between 2 bars and 7 bars. In some embodiments, the method 800 may further include regulating, using a timing component of the controller, timing of operations of the one or more of the modular ignition unit and a modular injector. In some embodiments, the method 800 may further include controlling, using the controller, the power to an on-board modular ignition unit of the modular ignition unit. In some embodiments, the method 800 may further include controlling, using the controller, the modular injector to disperse at least a fluid in one of a plurality of fluid spray volumes. This may be implemented, without limitation, as described above in reference to FIGS. 1-7.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
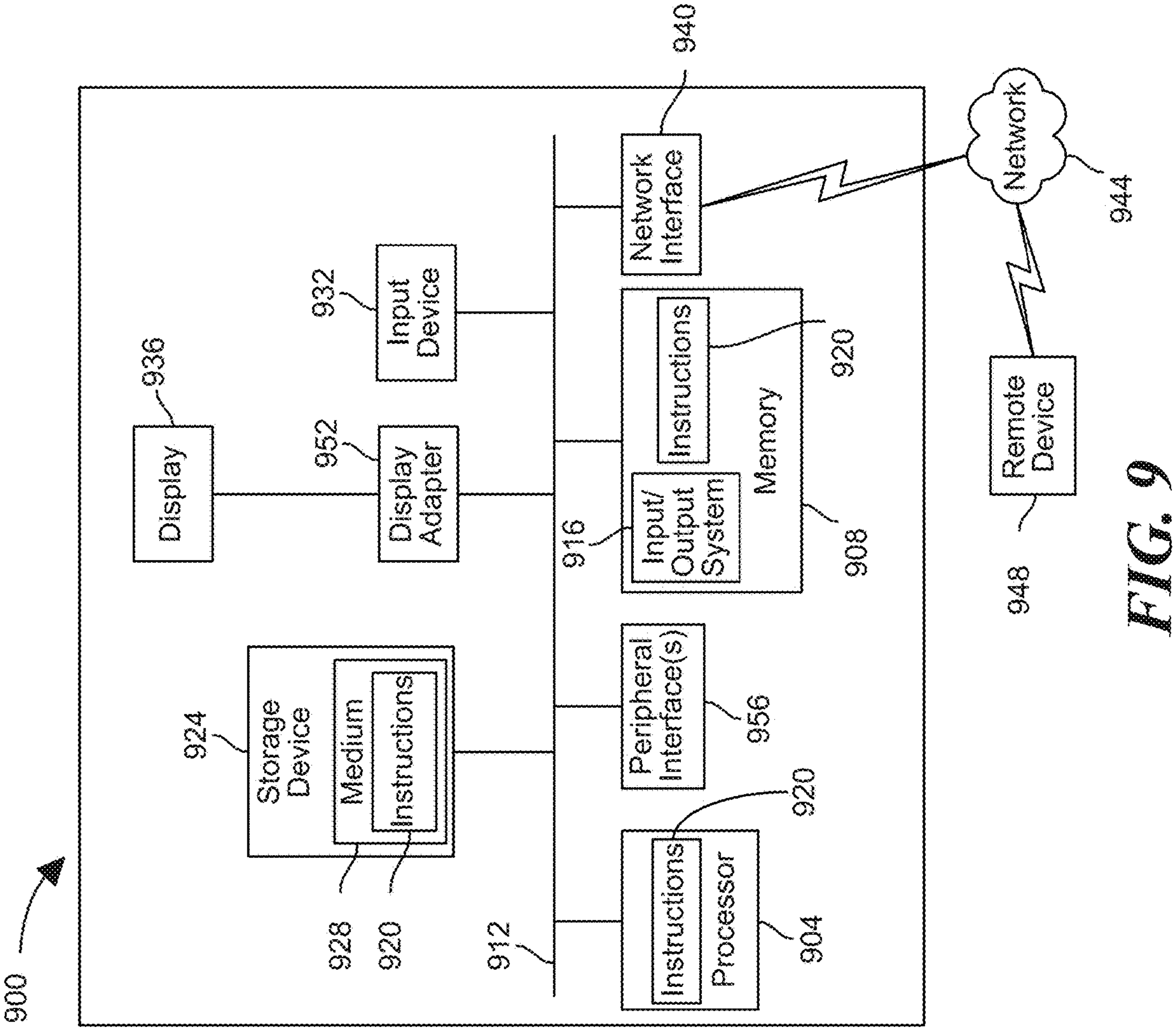
FIG. 9 is a block diagram of a computing system that can be used to implement any one or more of the methodologies disclosed herein and any one or more portions thereof.

FIG. 9 shows a diagrammatic representation of one embodiment of a computing device in the exemplary form of a computer system 900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Processor 904 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 904 may be organized according to Von Neumann and/or Harvard architecture as a non-limiting example. Processor 904 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 908 may include various components (e.g., machine-readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 2394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIREWIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 952 and display device 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. A modular plasma reactor apparatus, the apparatus:

a modular plasma reactor capable of generating a concentrated nitrogen solution for plant growth;

a housing surrounding the plasma reactor;

an ignition unit removably connected to the plasma reactor;

one or more injectors removably connected to the modular plasma reactor in fluidic connection with at least one reservoir and further comprising one or more valves configured to monitor, control or otherwise regulate the flow of fluid to the plasma reactor;

at least one reservoir removably connected to the injector;

a condenser configured to collect reactive products generated from electric discharge within the modular plasma reactor placed between the electric discharge and a growth medium for the plant growth;

and a controller communicatively connected to one or more of the ignition unit and the injector.

2. The apparatus of claim 1, wherein the at least one reservoir is connected with a pressure regulator removably connected to the at least one reservoir.

3. The apparatus of claim 1, wherein the controller is configured to control a power to the pressure regulator.

4. The apparatus of claim 2, wherein:

the pressure regulator comprises a low pressure compressor; and the controller is further configured to control the low-pressure compressor to output a pressure between 2 bars and 7 bars.

5. The apparatus of claim 1, wherein the controller comprises a timing component, wherein the timing component is configured to regulate timing of operations of the one or more of the ignition unit and the injector.

6. The apparatus of claim 1, wherein the ignition unit comprises an inductive coil.

7. The apparatus of claim 1, wherein:

the modular plasma reactor further comprises an on-board modular ignition unit; and the controller is further configured to control the power to the on-board modular ignition unit of the modular plasma reactor.

8. The apparatus of claim 1, wherein the controller is further configured to receive a connection signal, wherein the connection signal indicates a connection between the modular plasma reactor and the one or more of the modular ignition unit and the injector.

9. The apparatus of claim 1, wherein the controller is further configured to control the injector to disperse at least a fluid in one of a plurality of fluid spray volumes.

10. The apparatus of claim 1, wherein the controller comprises a programmable logic controller (PLC).

11. A method of use for a modular plasma reactor apparatus according to claim 1, the method comprising:

removably connecting an ignition unit to the modular plasma reactor apparatus, wherein the modular plasma reactor apparatus comprises a housing;

removably connecting an injector to the modular plasma reactor apparatus;

removably connecting at least one reservoir to the injector; and communicatively connecting a controller to one or more of the ignition unit and the injector.

12. The method of claim 11, further comprising:

removably connecting a pressure regulator to the at least one reservoir.

13. The method of claim 12, further comprising:

controlling, using the controller, a power to the pressure regulator.

14. The method of claim 12, further comprising:

using the controller to control a low-pressure compressor of the pressure regulator to output a pressure between 2 bars and 7 bars.

15. The method of claim 11, further comprising:

regulating, using a timing component of the controller, timing of operations of the one or more of the ignition unit and the injector.

16. The method of claim 11, wherein the ignition unit comprises an inductive coil.

17. The method of claim 11, further comprising: controlling, using the controller, the power to an on-board modular ignition unit of the modular plasma reactor apparatus.

18. The method of claim 11, further comprising: receiving, using the controller, a connection signal, wherein the connection signal indicates a connection between the modular plasma reactor apparatus and the one or more of the modular ignition unit, the modular injector and the modular pressure regulator.

19. The method of claim 11, further comprising:

controlling, using the controller, the injector to disperse the at least a fluid in one of a plurality of fluid spray volumes.

20. The method of claim 11, wherein the controller comprises a programmable logic controller (PLC).

* * * * *